United States Patent
Hongo et al.

(10) Patent No.: US 6,587,916 B2
(45) Date of Patent: Jul. 1, 2003

(54) MICROCOMPUTER WITH BUILT-IN PROGRAMMABLE NONVOLATILE MEMORY

(75) Inventors: Katsunobu Hongo, Tokyo (JP); Tsutomu Tanaka, Tokyo (JP); Toshihiro Sezaki, Tokyo (JP); Hiroyuki Kimura, Tokyo (JP); Mikio Kamiya, Tokyo (JP); Yasuhiro Ami, Tokyo (JP); Kunio Tani, Tokyo (JP); Tomohisa Iba, Tokyo (JP)

(73) Assignees: Mitsubishi Denki Kabushiki Kaisha, Tokyo (JP); Mitsubishi Electric Semiconductor System Corporation, Tokyo (JP); Mitsubishi Electric Engineering Company Limited, Tokyo (JP)

( * ) Notice: Subject to any disclaimer, the term of this patent is extended or adjusted under 35 U.S.C. 154(b) by 0 days.

(21) Appl. No.: 09/948,042

(22) Filed: Sep. 7, 2001

(65) Prior Publication Data

US 2002/0129195 A1 Sep. 12, 2002

(30) Foreign Application Priority Data

Mar. 8, 2001 (JP) .......................................... 2001-065389

(51) Int. Cl.[7] .............................................. G06F 13/00
(52) U.S. Cl. ................... 711/103; 711/154; 365/185.33; 365/226
(58) Field of Search ....................... 365/185.33, 185.29, 365/226; 327/536; 711/103, 154; 716/17; 712/37; 710/107

(56) References Cited

U.S. PATENT DOCUMENTS

| | | | | |
|---|---|---|---|---|
| 4,382,279 A | | 5/1983 | Ugon | |
| 4,752,871 A | * | 6/1988 | Sparks et al. | 365/185.11 |
| 5,313,429 A | * | 5/1994 | Chevallier et al. | 365/185.29 |
| 5,444,664 A | * | 8/1995 | Kuroda et al. | 365/185.29 |
| 5,923,838 A | * | 7/1999 | Hongo | 714/42 |
| 5,959,882 A | * | 9/1999 | Yoshida et al. | 365/185.03 |
| 5,983,330 A | * | 11/1999 | Miwa et al. | 710/262 |
| 6,026,014 A | * | 2/2000 | Sato et al. | 365/185.03 |
| 6,032,221 A | * | 2/2000 | Hongo | 365/185.33 |
| 6,118,706 A | * | 9/2000 | Smayling et al. | 365/185.11 |
| 6,154,412 A | * | 11/2000 | Ishikawa et al. | 365/189.06 |
| 6,181,598 B1 | | 1/2001 | Matsubara et al. | |
| 6,392,932 B1 | * | 5/2002 | Ishii et al. | 365/185.22 |
| 6,421,757 B1 | * | 7/2002 | Wang et al. | 711/103 |

FOREIGN PATENT DOCUMENTS

| | | |
|---|---|---|
| JP | 5-266219 | 10/1993 |
| JP | 10-134024 | 5/1998 |
| JP | 11-306009 | 11/1999 |
| WO | WO99/01824 | 1/1999 |

\* cited by examiner

Primary Examiner—Hong Kim

(57) ABSTRACT

A microcomputer comprises: a flash memory for storing rewriting control F/W and user S/F; a command register for specifying content of rewriting control; a address register to be subjected to rewriting-control; a data register for specifying data to be written; a power-supply pump circuit in the flash memory; and a control signal register for specifying/outputting a control signal to a memory decoder. A CPU of the microcomputer is capable of accessing these four registers to perform writing or reading. A given bit of the control signal register corresponds to a given control signal. A value written to the register becomes a control signal that will be directly supplied to both of the power supply circuit and the memory decoder, in the flash memory, to control them. By rewriting a set value of this control signal register using the rewriting control F/W according to a specified sequence, processing such as "erase" and "program" of the flash memory is performed. As a result, a layout area of an automatic sequence circuit is decreased, and a change in a sequence is also facilitated.

19 Claims, 15 Drawing Sheets

(ADDRESS EEh: SIGNAL-OUTPUT CONTROL REGISTER)

FIG.10

SOFTWARE COMMAND TABLE 1

| SOFTWARE COMMAND | ADDRESS REGISTER SETTING (24 BITS) | DATA REGISTER SETTING (16 BITS) | COMMAND REGISTER SETTING (16 BITS) |
|---|---|---|---|
| BLOCK ERASE | BLOCK TOP ADDRESS | (SETTING IS NOT REQUIRED) | 2020h |
| (WORD) PROGRAM | WRITTEN ADDRESS | WRITTEN DATA | 4040h |

FIG.11

ERROR STATUS TABLE 2

| STATUS CODE (b5, b4) | CONDITIONS OF STATUS CODE |
|---|---|
| 0, 0 | AT THE TIME OF NORMAL TERMINATION OF COMMAND, OR RESET |
| 0, 1 | WHEN A PROGRAM ERROR OCCURS |
| 1, 0 | WHEN AN ERASE ERROR OCCURS |
| 1, 1 | WHEN AN ILLEGAL COMMAND IS INPUTTED |

FIG.17

MICROCOMPUTER OPERATION-MODE TABLE 3

| OPERATION MODES | MODE SELECTION TERMINALS | | CPU READ | | | REWRITE | | RESET VECTOR |
|---|---|---|---|---|---|---|---|---|
| | MD1 | MD0 | USER AREA | F/W AREA | | USER AREA | F/W AREA | |
| USER MODE | 0 | 0 | ○ | ○ | | ○ | × | USER AREA |
| TEST MODE 1 | 0 | 1 | ○ | ○ | | ○ | ○ | USER AREA |
| TEST MODE 2 | 1 | 0 | × | ○ | | ○ | ○ | EXTERNAL MEMORY |
| TEST MODE 3 | 1 | 1 | ○ | ○ | | ○ | ○ | RAM |

○:PERMITTED, ×:PROHIBITED

MICROCOMPUTER WITH BUILT-IN PROGRAMMABLE NONVOLATILE MEMORY

BACKGROUND OF THE INVENTION

1. Field of the Invention

The present invention relates to a microcomputer in which a programmable nonvolatile memory such as a flash memory is built, and more specifically, to a function of rewriting the nonvolatile memory.

2. Description of the Prior Art

Up to this time, a microcomputer characterized by the following was conventionally known: having dedicated hardware (H/W), that is to say, an automatic sequence circuit, which controls rewriting of content of a flash memory that is built in the microcomputer; and a CPU (central processing unit) of the microcomputer writes or sets a control command to the hardware, and thereby starts up hardware operation for rewriting. In this case, it was necessary for a user to transfer a rewriting control program having a function of issuing a command, and the like, to a built-in RAM under the control of the user. In addition, it was also necessary to inhibit interrupt on the user side (Example: M37902FGCHP produced by Mitsubishi Electric Corporation).

Because this rewriting processing was automatically performed by the hardware, the rewriting control program, which should be prepared on the user side, could be simplified to some degree. However, on the other hand, a layout area of an automatic sequence circuit was large, which resulted in high cost. Moreover, repair of the hardware was required to perform bug fixing of a rewriting sequence and to adapt the rewriting sequence to wafer process most suitably. The repair, however, could not be carried out easily.

On the other hand, there is also a case in which only a required minimum of automatic sequence circuits for rewriting control is provided. In this case, even time management, and comparison/judgment of a result, which are required for rewriting processing, are performed by software (S/W) on the user side (Examples: M37754FFCHP produced by Mitsubishi Electric Corporation, H8/3062F-ZTAT produced by Hitachi, Ltd.).

Because the quantity of the hardware is small, low-cost chips can be produced. On the other hand, the following problem arises: a load of the rewriting control software, which should be made on the user side, is heavy resulting in a long software development period.

In addition, a programmable-nonvolatile-memory device and a microcomputer using the same, are described in international application WO99/01824. The microcomputer comprises a control register for outputting a signal, which controls circuits (a sense amplifier, and a step-up circuit) relating to rewriting of an EEPROM (a nonvolatile memory) in the microcomputer. A means for rewriting the EEPROM by writing data directly from outside of the microcomputer to this control register successively is disclosed in the international application. Its object is to reduce cost by removing a rewriting control circuit.

This reference describes a control technology for writing required data from a writer, which is outside the microcomputer, to this control register. However, rewriting of the nonvolatile memory while user software is being operated is not described in this reference.

Moreover, although the reference states that a CPU of the microcomputer is capable of writing data to this control register in a "Serial I/O mode" in which a serial writer is used, there is no description other than that. There is no description of where the control software is specifically placed at the time of writing, and of how it operates.

In the EEPROM, reading is limited to a memory bit as an object to be rewritten. As a result, it is comparatively easy to manage the control software. However, practically, in the case of the microcomputer with built-in flash memory, reading cannot be performed when rewriting the flash memory that stores the control program. Therefore, the following limitations become indispensable conditions: executing by the control program on the built-in RAM; inhibiting interrupt; and the like. Management of this control software is very important for the microcomputer with built-in flash memory. In other words, in this rewriting technology of the microcomputer with built-in EEPROM, which uses the writer, rewriting of the flash memory during user software operation cannot possibly be realized.

The conventional microcomputers with built-in programmable nonvolatile memory are configured as described above. As a result, concerning the microcomputer with an automatic sequence circuit, there are problems in that a layout area is large, resulting in high cost; and a change in sequence is not easy. On the other hand, concerning the microcomputer that does not has the automatic sequence circuit, there are problems in that a load of rewriting control software on the user side is heavy, resulting in a long software development period.

SUMMARY OF THE INVENTION

The present invention has been made to solve the problems described above. An object of the present invention is to obtain a microcomputer with built-in programmable nonvolatile memory that is capable of the followings: decreasing a layout area by removing an automatic sequence circuit, and thereby aiming at low cost; facilitating a change in a rewriting sequence for bug fixing and for adapting the rewriting sequence to a wafer process most suitably; and reducing a load of user side software, and also shortening a software development period, by loading rewriting control firmware (F/W).

According to an aspect of the present invention, there is provided a microcomputer with built-in programmable nonvolatile memory, the microcomputer comprising: a nonvolatile memory for storing rewriting control firmware and user software in separate unit blocks respectively; at least four registers, which can be written or read by a CPU of the microcomputer: a command register for specifying content of rewriting control; an address register for specifying an address to be subjected to rewriting control; a data register for specifying data to be written; and a control signal register for specifying a control signal for a power-supply pump circuit in a nonvolatile memory and a memory decoder; wherein: the power-supply pump circuit and the memory decoder are controlled by associating given bits of the control signal register with control signals connected to the power-supply pump circuit and the memory decoder; and the rewriting control firmware reads a value that is set in the command register, the address register, or the data register, and rewrites a set value in the control signal register according to a sequence specified for each command corresponding to the read value, which is set in the command register, the address register, or the data register, to operate the power-supply pump circuit and the memory decoder, thereby executing rewriting processing including "erase" and "program" of the nonvolatile memory.

In this case, a unit block for storing the rewriting control firmware and a unit block for storing the user software may be configured so that addresses of both blocks are not consecutive.

In addition, the microcomputer with built-in programmable nonvolatile memory may comprise a status register that can be written or read by a CPU, wherein after completion of rewriting processing that includes "erase" and "program", the rewriting control firmware writes a result of the execution into the status register.

Moreover, the rewriting control firmware comprises a user interface control unit for decoding at least a command that is set in the command register, and a command-execution control unit for controlling the power-supply pump circuit and the memory decoder for each specified command; and firmware of this command-execution control unit is transferred to a built-in RAM, and is executed on this RAM.

The rewriting control firmware is configured to start up as a result of a jump from the user software to a top address of the rewriting control firmware, and to return to a next instruction of the jump instruction in the user software after command execution is completed.

In the case of an "erase" command, the rewriting control firmware executes the "erase" and verification after the "erase" consecutively; in the case of a "program" command, the rewriting control firmware executes the "program" and verification after the "program" consecutively; and if a result of the verification is abnormal, it is judged to be an erase error or a program error respectively.

The rewriting control firmware sets a result of command execution including "erase" and "program" in the status register; and if a command, which is not a legal command code, or an address, which is not allowed to be specified, is specified in the command register or in the address register, an error code indicating an illegal command is set in the status register, and in this case, processing may not be performed hereafter.

The rewriting control firmware does not clear the status register, and reads the status register before executing a command that is set in the command register; and if a result of the status reading is an error code other than normal termination, the rewriting control firmware may not perform processing hereafter.

In addition, a number of bits of a command code, which should be written to the command register, ranges from 12 to 16. Moreover, the rewriting control firmware may decode all of the bits of this command code.

A number of bits of an address, which should be written to the address register, may be taken more than a number of bits of an address that can specify a nonvolatile memory space. Moreover, the rewriting control firmware may decode all of the bits of this address.

Furthermore, the microcomputer with built-in programmable nonvolatile memory may comprise a nonvolatile memory rewriting-mode selection bit that can be set by the CPU, wherein the control signal register can be rewritten when a specific value is written to this firmware rewriting-mode selection bit.

The control signal register may be a register that can be set by the CPU; and a control signal, which is output from the control signal register, may reset the power-supply pump circuit and the memory decoder by a reset signal, to a state in which rewriting is prohibited.

The control signal register may be a register that can be set by the CPU; and a control signal, which is output from the control signal register, may reset the power-supply pump circuit and the memory decoder by a watchdog-timer interrupt signal, to a state in which rewriting is prohibited.

The firmware-rewriting-mode selection bit may be configured to be reset to a state, in which a non-rewriting mode is specified, not only by a reset signal of the microcomputer but also by the watchdog-timer interrupt signal.

An accumulator in the CPU may be allocated as a command register.

Both or either of the command register and the status register may be allocated not to registers but to specific addresses in the built-in RAM.

The microcomputer with built-in programmable nonvolatile memory may comprise a dedicated timer circuit used when the nonvolatile memory is rewritten.

The microcomputer with built-in programmable nonvolatile memory may comprise a clock switching circuit for switching an operation clock source for the CPU and the peripheral device to a clock inputted from a clock terminal or to a clock generated by a built-in self-excited oscillator, wherein: these clocks are switched according to a state of the clock-source selection bit that can be set by the CPU; and at the time of rewriting of the nonvolatile memory, a clock on the self-excited oscillator side is selected.

The microcomputer with built-in programmable nonvolatile memory may comprise a clock switching circuit for switching an operation clock source for the CPU to a clock inputted from a clock terminal or to a clock generated by a built-in self-excited oscillator, wherein: these clocks are switched according to a state of the clock-source selection bit that can be set by the CPU; and at the time of rewriting of the nonvolatile memory, a clock on the self-excited oscillator side is selected as an operation clock source for the CPU, while a clock source for peripheral devices such as a timer and a serial I/O is not switched from the clock inputted from the clock terminal.

The microcomputer with built-in programmable nonvolatile memory may comprise a clock switching circuit for switching an operation clock source for the CPU and a watchdog timer to a clock inputted from a clock terminal or to a clock generated by a built-in self-excited oscillator, wherein: these clocks are switched according to a state of the clock-source selection bit that can be set by the CPU; and at the time of rewriting of the nonvolatile memory, a clock on the self-excited oscillator side is selected as an operation clock source for the CPU and the watchdog timer, while a clock source for peripheral devices such as a timer and a serial I/O is not switched from the clock inputted from the clock terminal.

The self-excited oscillator for the voltage charge pump in the nonvolatile memory may also be used for the built-in self-excited oscillator.

The self-excited oscillator for the voltage charge pump in the nonvolatile memory may also be used for a clock source of a timer circuit.

The self-excited oscillator may not operated continuously; a oscillation permission bit, which can be set by the CPU, is provided; and if this bit is in a specific state, the self-excited oscillator is operated.

For the switching of an operation clock source, the operation clock source may be allowed to be switched to a clock generated by the self-excited oscillator if a clock generated by the self-excited oscillator is selected by the clock-source selection bit, and if operation permission of the self-excited oscillator is selected by the oscillation permission bit.

The microcomputer with built-in programmable nonvolatile memory may include a plurality of operation modes, which are determined by a voltage level applied to an operation-mode-selection input terminal, wherein at least one operation mode is configured to prohibit rewriting of a rewriting-control-firmware storing area of the nonvolatile memory.

The microcomputer with built-in programmable nonvolatile memory may include a plurality of operation modes that are determined by a voltage level applied to an operation-mode-selection input terminal, wherein: a second operation mode is configured as a mode in which a reset vector address that is accessed after reset is cleared is in an external area; and in this second operation mode, at least an area for storing user software in the nonvolatile memory cannot be read from the CPU, while rewriting of the area for storing user software in the nonvolatile memory and an area for storing rewriting control firmware is permitted.

In the second operation mode, the area for storing rewriting control firmware in the nonvolatile memory may be read by the CPU.

The microcomputer with built-in programmable nonvolatile memory may include a plurality of operation modes that are determined by a voltage level applied to an operation-mode-selection input terminal, wherein: a third operation mode is configured as a mode in which a reset vector address that is accessed after reset is cleared is in an external area; and in this third operation mode, the nonvolatile memory area can be read from the CPU, while rewriting of the area for storing user software in the nonvolatile memory and the area for storing rewriting control firmware is permitted.

The microcomputer with built-in programmable nonvolatile memory may include a plurality of operation modes that are determined by a voltage level applied to an operation-mode-selection input terminal, wherein: a fourth operation mode is configured as a mode in which direct writing to a built-in RAM from outside during resetting is permitted, and in which a reset vector address after clearing the reset is set in the RAM; and in this fourth operation mode, the nonvolatile memory area can be read from the CPU, while rewriting of the area for storing user software in the nonvolatile memory and the area for storing rewriting control firmware is permitted.

A state of the operation-mode-selection input terminal may be read by the CPU.

The rewriting control firmware may read a state of the operation-mode-selection input terminal; and in the operation mode in which rewriting of the firmware area of the nonvolatile memory is prohibited, the rewriting-control-firmware storing area of the nonvolatile memory may not be rewritten, and it may be judged to be an illegal command.

The microcomputer with built-in programmable nonvolatile memory may include a rewriting command for firmware storing area which is enabled in an operation mode in which rewriting of the rewriting-control-firmware storing area of the nonvolatile memory is permitted.

BRIEF DESCRIPTION OF THE DRAWINGS

FIG. 10 is a software command table;

FIG. 11 is an error-status table;

FIG. 17 is a table of microcomputer's operation modes.

DETAILED DESCRIPTION OF THE PREFERRED EMBODIMENTS

Embodiments of the present invention will be described as below.

First Embodiment
(Hardware Configuration)

First of all, a hardware configuration of a microcomputer with built-in programmable nonvolatile memory according to the first embodiment of the present invention will be described as a microcomputer with built-in flash memory as below, taking a case, where a nonvolatile memory is a flash memory, as an example.

Figure 1:
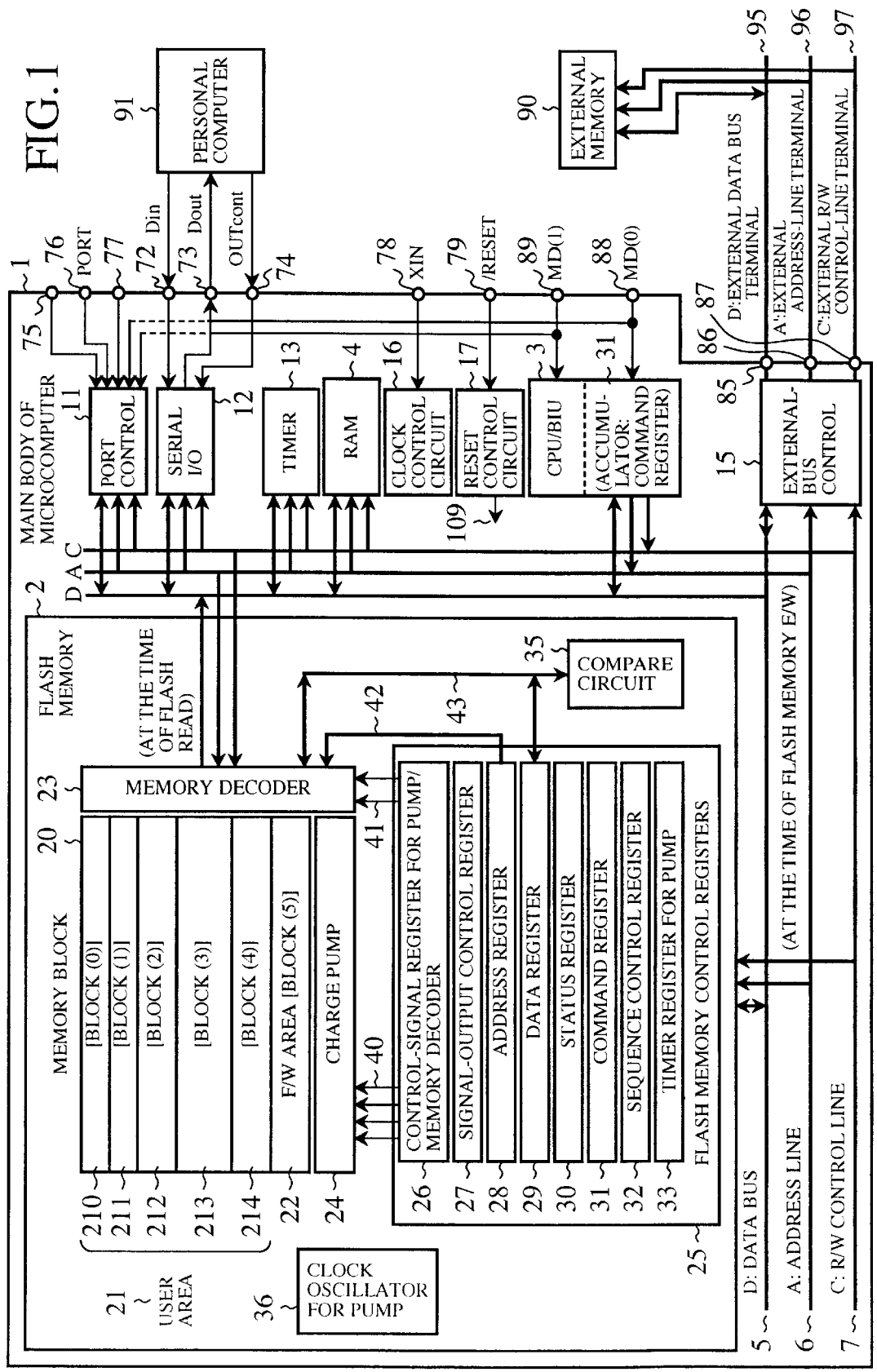
FIG. 1 is a block diagram illustrating a configuration of a microcomputer with built-in flash memory according to a first embodiment of the present invention.

FIG. 1 is a block diagram illustrating a configuration of the microcomputer with built-in flash memory according to the first embodiment. In FIG. 1, reference numeral 1 is a microcomputer as a main body. Reference numeral 2 is a flash memory block (a nonvolatile memory). Reference numeral 3 is a central processing unit and a bus interface unit (hereinafter referred to as CPU/BIU for short). Reference numeral 4 is a RAM. Reference numerals 5, 6, and 7 are an (internal) data bus for transmitting data, an (internal) address line for transmitting an address from the CPU/BIU 3, and an (internal) R/W control line for transmitting read/write (R/W) control information from the CPU/BIU 3 respectively. Reference numeral 11 is a port control block for controlling a data input from and a data output to the following: ports 75, 76, and 77, and an operation mode selection input terminals 88 and 89. Reference numeral 12 is an serial I/O. Reference numerals 72, 73, and 74 are a data input (Din) terminal, a data output (Dout) terminal, and a data-output-limit input (OUTcont) terminal, which are connected to the serial I/O 12. Reference numeral 13 is a timer.

In addition, reference numeral 15 is an external-bus control block for controlling an input/output of a signal between the data bus 5 and an external data bus terminal 85, between the address line 6 and an external address line terminal 86, and between the R/W control line 7 and an external R/W control-line terminal 87. Reference numeral 16 is a clock control circuit for generating an internal clock, which is supplied to each block in the microcomputer 1, from a clock inputted from a clock XIN input terminal 78. Reference numeral 17 is a reset control circuit for generating a reset signal 109, for each block in the microcomputer 1, from a reset input inputted from a /RESET input terminal 79.

It should be noted that a command register mentioned below may be set in for example a register, such as an accumulator, in the CPU/BIU 3.

Moreover, memories and a peripheral equipment group in the microcomputer 1 including the flash memory block 2, the RAM 4, the port control block 11, and the serial I/O 12, the timer 13, and the external-bus control block 15 are configured to read/write data from/to the CPU/BIU 3 via the data bus 5, the address line 6, and the R/W control line 7.

Next, a configuration inside the flash memory block 2 shown in FIG. 1 will be described.

In FIG. 1, reference numeral 20 is a memory block comprising a memory cell array including an actual storage element, an address decoder, and the like. Reference numeral 23 is a memory decoder comprising an address latch circuit, and an address predecoder. Reference numeral 24 is a voltage charge pump circuit (a power-supply pump circuit) for properly generating an internal voltage required for erasing, writing, reading, and the like, of a flash memory. Reference numeral 25 is a flash-memory control register group that is used when rewriting a flash memory (erasing and writing). Reference numeral 35 is a compare circuit for comparison after erasure (reading to check whether or not the erasure has been completed). Reference numeral 36 is a clock oscillator for pump comprising a self-excited oscillator such as a ring oscillator, which generates a clock that should be supplied to the voltage charge pump circuit 24.

The memory block 20 is divided into a user area 21 for a user and a F/W area 22 for storing rewriting firmware (F/W). Additionally, the user area 21 is further divided into independent blocks [block (0)] 210 through [block (4)] 214, each of which is separately erased. In this connection, the F/W area 22 is another erasing block [block (5)] that is not included in the blocks 210 through 214.

Moreover, the flash-memory control register group 25 comprises: a control-signal register for pump/memory decoder 26 for outputting control signals 41, 40 to the voltage charge pump circuit 24 and the memory decoder 23 respectively; a signal-output control register 27 for controlling output timing of control signals 40, 41 from the control-signal register for pump/memory decoder 26; an address register 28 for setting an address of a flash-memory block to be erased, an address of a flash memory to be written, and the like; a data register 29 for setting data to be written, and the like; a status register 30 for setting a status that shows execution results of erasure and writing; a command register 31 for setting software commands including an erase command (hereinafter referred to as "erase" command) and a write command (hereinafter referred to as "program" command); a sequence control register 32 for controlling operation of related circuits when rewriting a flash memory; and a timer register for pump 33 having a timer circuit for measuring time at which a control signal 40 for the voltage charge pump circuit 24 should be output, and the like. All of them are configured to read data from, or write data to, the CPU/BIU 3 via the data bus 5, the address line 6, and the R/W control line 7.

It should be noted that, when for example a register such as an accumulator in the CPU/BIU 3 is used as the command register 31, the flash-memory control register group 25 does not include the command register 31.

The address register 28 is connected to the memory decoder 23 via the address line 42 in the flash memory. The data register 29 is connected to the memory decoder 23 and the compare circuit 35 via the data bus 43 in the flash memory.

In addition, an external circuit/element of the microcomputer 1 shown in FIG. 1 will be described.

In FIG. 1, reference numeral 90 is an external memory such as a flash memory and an EPROM for example, which is connected through an external data bus 95, an external address line 96, and an external R/W control line 97 that are connected to an external-data-bus terminal 85, an external-address-line terminal 86, and an external R/W control-line terminal 87 respectively. Reference numeral 91 is a personal computer (hereinafter, it is simply abbreviated as "personal computer") connected to the data input (Din) terminal 72, the data output (Dout) terminal 73, and the data output control input (OUTcont) terminals 74 of the serial I/O 12 by for example a serial connecting means such as RS-232C.

The CPU/BIU 3 of the microcomputer 1 is capable of reading the external memory 90 through the external-bus control block 15 in an operation mode that can access an external area (for some kinds of the external memories, writing is possible). In addition, the CPU/BIU 3 is capable of inputting data from and outputting data to the personal computers 91 through the serial I/O 12.

Figure 2:
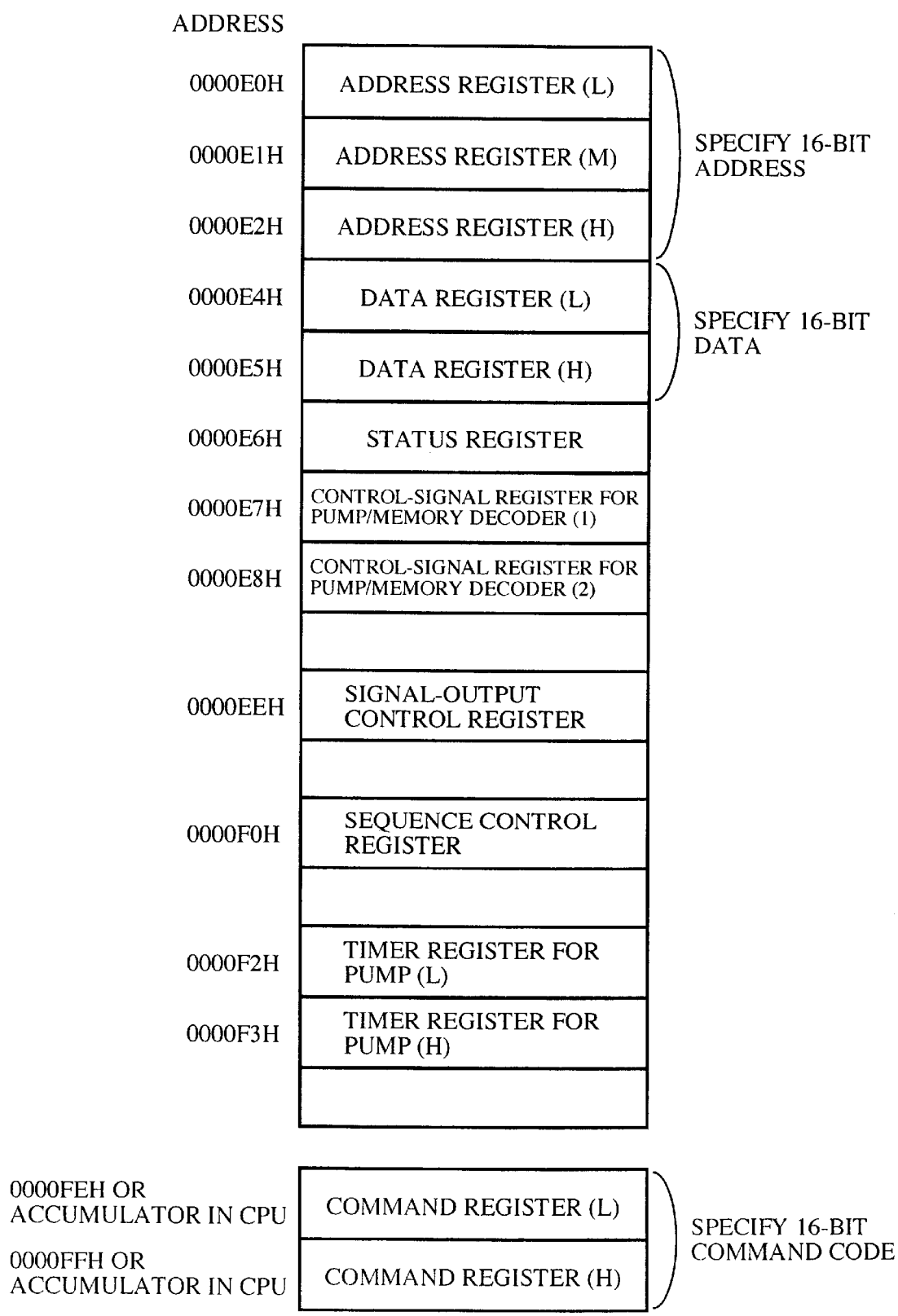
FIG. 2 is a memory map of a flash-memory control register group.

FIG. 2 shows a memory map of the flash-memory control register group 25. Accessing an address shown in FIG. 2 permits a register corresponding to the address to be written and read.

Figure 3:
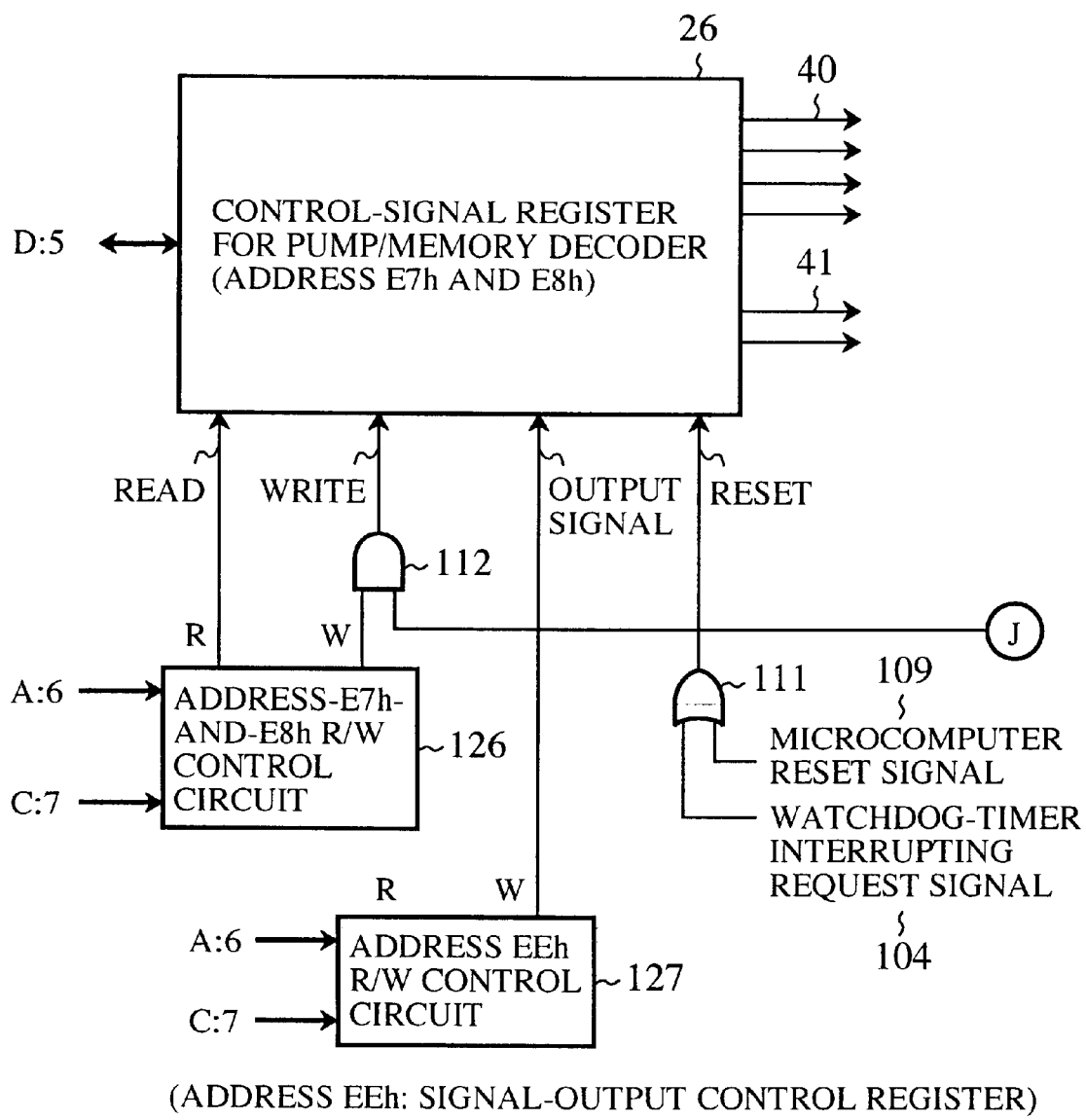
FIG. 3 is a block diagram illustrating a configuration of a control-signal register for pump/memory decoder and its attached circuits.

FIG. 3 is a block diagram illustrating a configuration of the control-signal register for pump/memory decoder 26 and its attached circuits. In FIG. 3, reference numeral 126 is an address-E7h-and-E8h R/W control circuit for decoding an address on the address line 6 and read/write (R/W) control information from the CPU/BIU 3 on the R/W control line 7, and for outputting a read signal and a write signal to the control-signal register for pump/memory decoder 26 at the time of accessing E7h and E8h (addresses of a pump/memory control signal register). Reference numeral 127 is an address EEh R/W control circuit for decoding an address on the address line 6 and read/write (R/W) control information from the CPU/BIU 3 on the R/W control line 7, and for outputting a signal output signal to the control-signal register for pump/memory decoder 26 at the time of accessing an address E7h (an address of the signal-output control register).

In addition, reference numeral 111 is an OR-gate for performing OR operation of a microcomputer reset signal 109 with a watchdog-timer interrupting request signal 104 described below, and for outputting the ORed signal to a reset-signal input end of the control-signal register for pump/memory decoder 26. Reference numeral 112 is an AND gate for performing AND operation of a write signal from the address-E7h-and-E8h R/W control circuit 126 with an output 114 of a FM rewriting mode bit of the sequence control register 32 described below, and for outputting the ANDed signal to a write-signal input end of the control-signal register for pump/memory decoder 26.

This control-signal register for pump/memory decoder 26 is connected to the data bus 5, and can be written or read from the CPU/BIU 3. Additionally, control signals 40 and 41 are output to the voltage charge pump circuit 24 and the memory decoder 23. In this case, each of the control signals corresponds to each bit of the control-signal register for pump/memory decoder 26.

Figure 5:
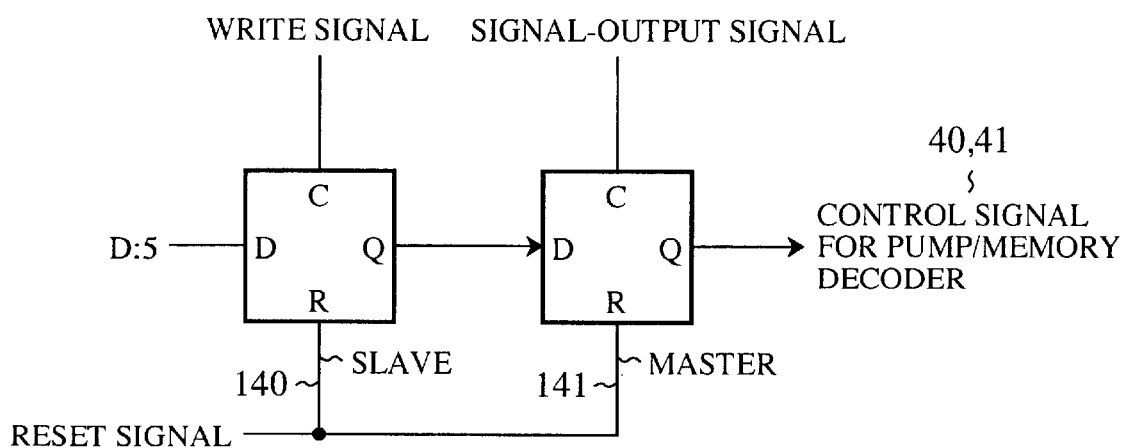
FIG. 5 is a block diagram illustrating a configuration of one bit of a control-signal register for pump/memory decoder.

FIG. 5 is a block diagram illustrating a 1-bit configuration of the control-signal register for pump/memory decoder 26. In FIG. 5, reference numerals 140 and 141 are a slave flip-flop (hereinafter, it is abbreviated as F/F) circuit and a master flip-flop circuit respectively. This slave F/F 140 latches a state of a corresponding bit of the data bus 5 when a write signal becomes active, and clears its content when a reset input signal becomes active. On the other hand, the master F/F 141 latches a state of the slave F/F 140 when a signal output signal becomes active, and clears its content when a reset input signal becomes active. An output of the master F/F 141 becomes one of signals that corresponds to the control signals 40 and 41 supplied to the voltage charge pump circuit 24 and the memory decoder 23.

Figure 4:
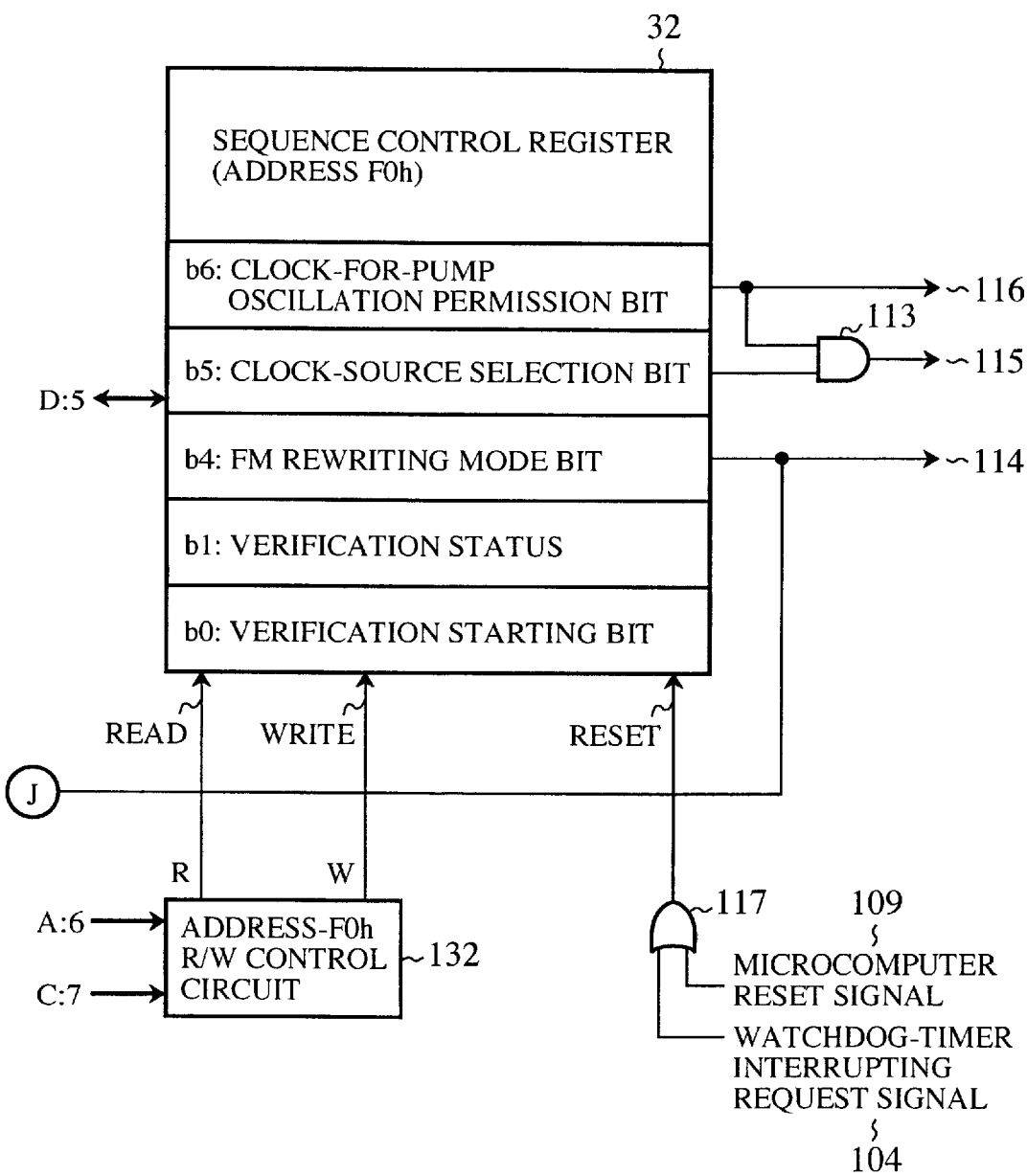
FIG. 4 is a block diagram illustrating a configuration of a sequence control register and its attached circuits.

FIG. 4 is a block diagram illustrating configurations of the sequence control register 32 and its attached circuits. In FIG. 4, reference numeral 132 is an address-F0h R/W control circuit for decoding an address on the address line 6 and read/write (R/W) control information from the CPU/BIU 3 on the R/W control line 7, and for outputting a read signal and a write signal to the sequence control register 32 at the time of accessing an address F0h (an address of the sequence control register). Reference numeral 113 is an AND gate for performing AND operation of a bit-6 output of the sequence control register 32 with a bit-5 output. In addition, reference numeral 117 is an OR gate for performing OR operation of a microcomputer reset signal 109 with a watchdog-timer interrupting request signal 104 described below, and for outputting the ORed signal to a reset-signal input end of the sequence control register 32. Additionally, bit 0, 1, 4, 5, and 6 of the sequence control register 32 are allocated to a verification starting bit, a verification status, a FM rewriting mode bit, a clock-source selection bit, and a clock-for-pump oscillation permission bit respectively. This sequence control register 32 is connected to the data bus 5, and can be written or read from the CPU/BIU 3.

Figure 6:
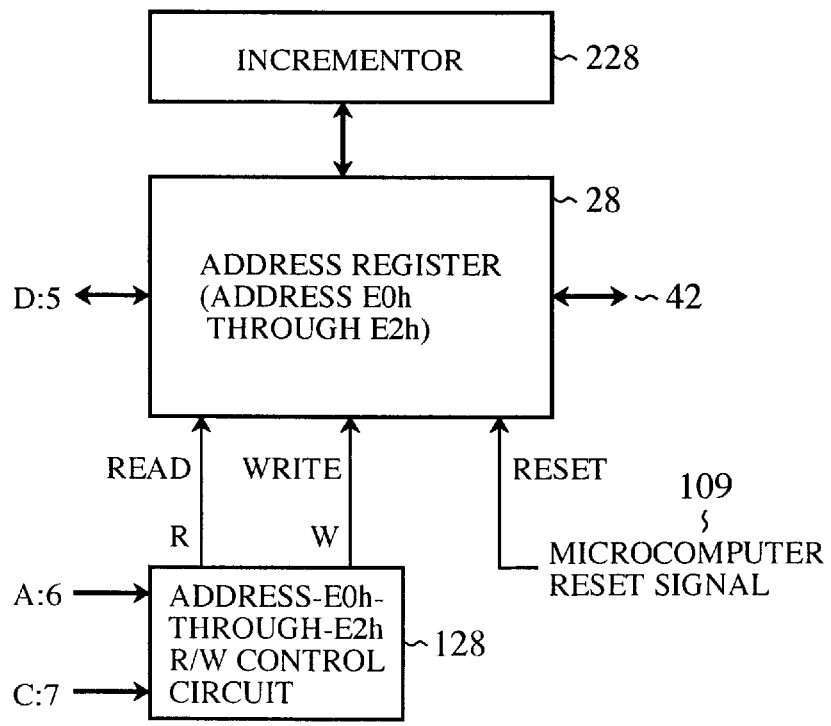
FIG. 6 is a block diagram illustrating a configuration of an address register and its attached circuits.

FIG. 6 is a block diagram illustrating configurations of the address register 28 and its attached circuits. In FIG. 6, reference numeral 128 is an address-E0h-through-E2h R/W control circuit for decoding an address on the address line 6 and read/write (R/W) control information from the CPU/BIU 3 on the R/W control line 7, and for outputting a read signal and a write signal to the address register 28 at the time of accessing addresses E0h through E2h (addresses of the status register). Reference numeral 228 is an address incrementor that is attached to the address register 28.

This address register 28 is connected to the data bus 5, and is capable of reading or writing from the CPU/BIU 3. In addition, an address line 42 in the flash memory is connected to the address register 28. By bit 0 (verification starting bit) of the sequence control register 32, the address incrementor 228 increments an address value at the time of verification after erasure described later.

Figure 7:
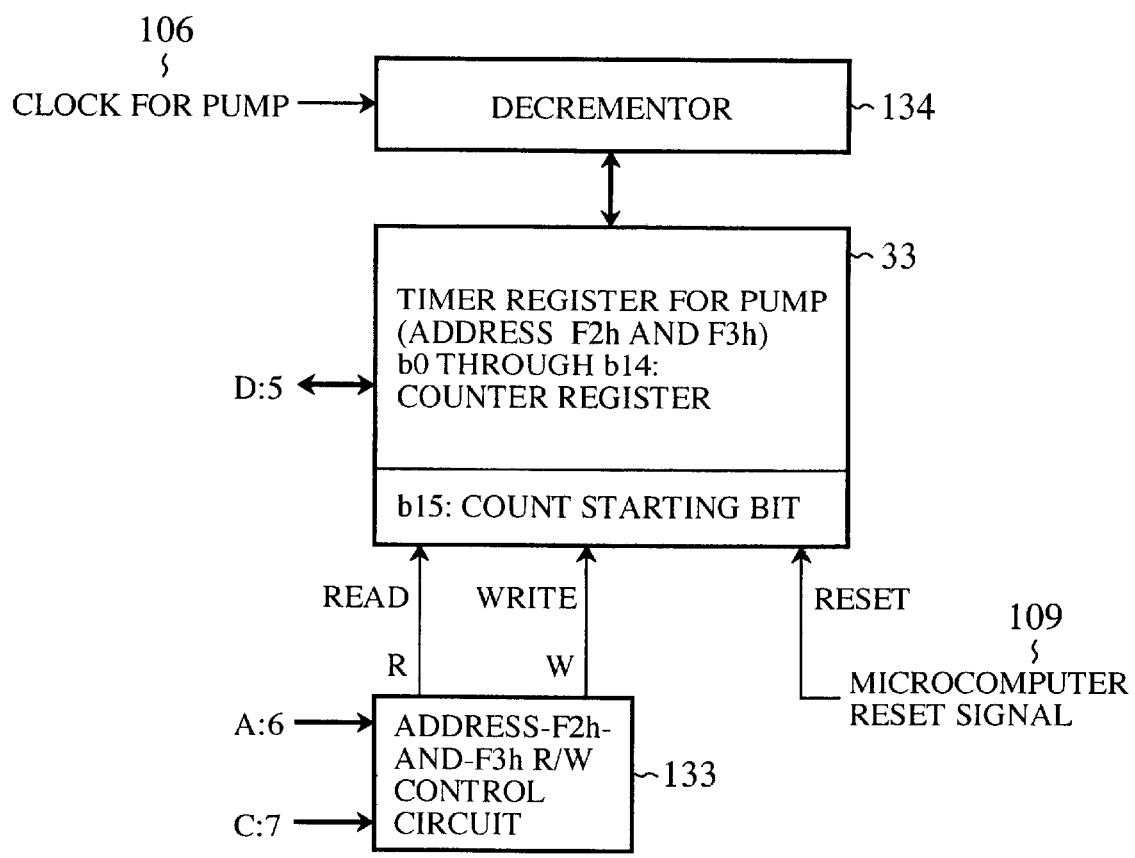
FIG. 7 is a block diagram illustrating a configuration of a timer register for pump and its attached circuits.

FIG. 7 is a block diagram illustrating configurations of the timer register for pump 33 and its attached circuits. In FIG. 7, reference numeral 133 is an address-F2h-and-F3h R/W control circuit for decoding an address on the address line 6 and read/write (R/W) control information from the CPU/BIU on the R/W control line 7, and for outputting a read signal and a write signal to the timer register for pump 33 at the time of accessing addresses F2h and F3h (addresses of the timer register for pump). Reference numeral 134 is a decrementor for decrementing values of the counter register, that is to say, bits 0 through 14 of the timer register for pump 33, while synchronizing with a clock of a clock for pump 106. This decrementor 134 and the timer register for pump 33 constitute a 15-bits counter.

The bit 15 of the timer register for pump 33 is allocated to a count starting bit. When "1" is written to this count starting flag, the decrementor 134 starts decrement. When a value of the timer register for pump 33 becomes "0", the count starting bit automatically becomes "0". This timer register for pump 33 is connected to the data bus 5, and can be written or read from the CPU/BIU 3.

Figure 8:
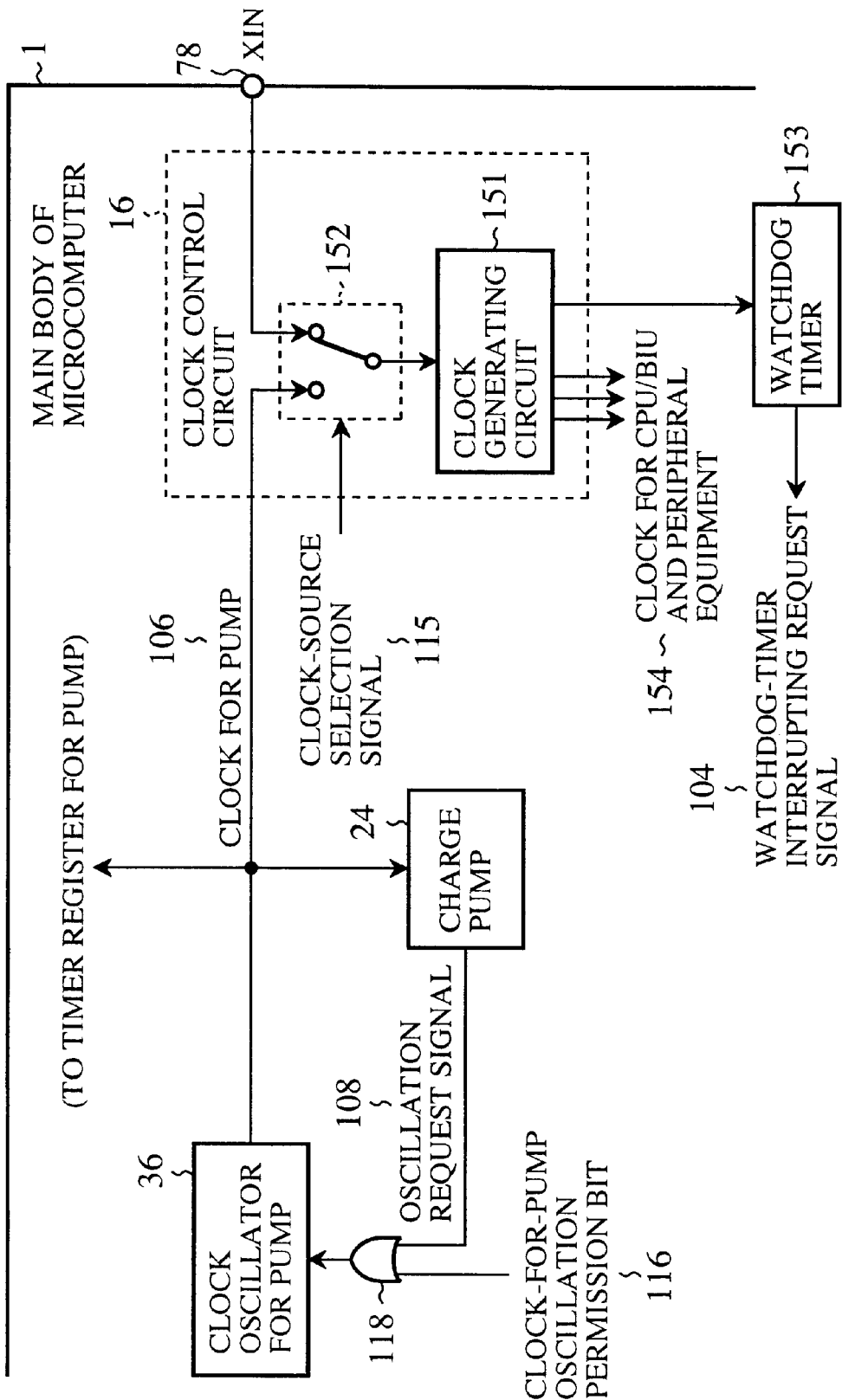
FIG. 8 is a block diagram illustrating a configuration of circuits relating to clock control.
Figure 9:
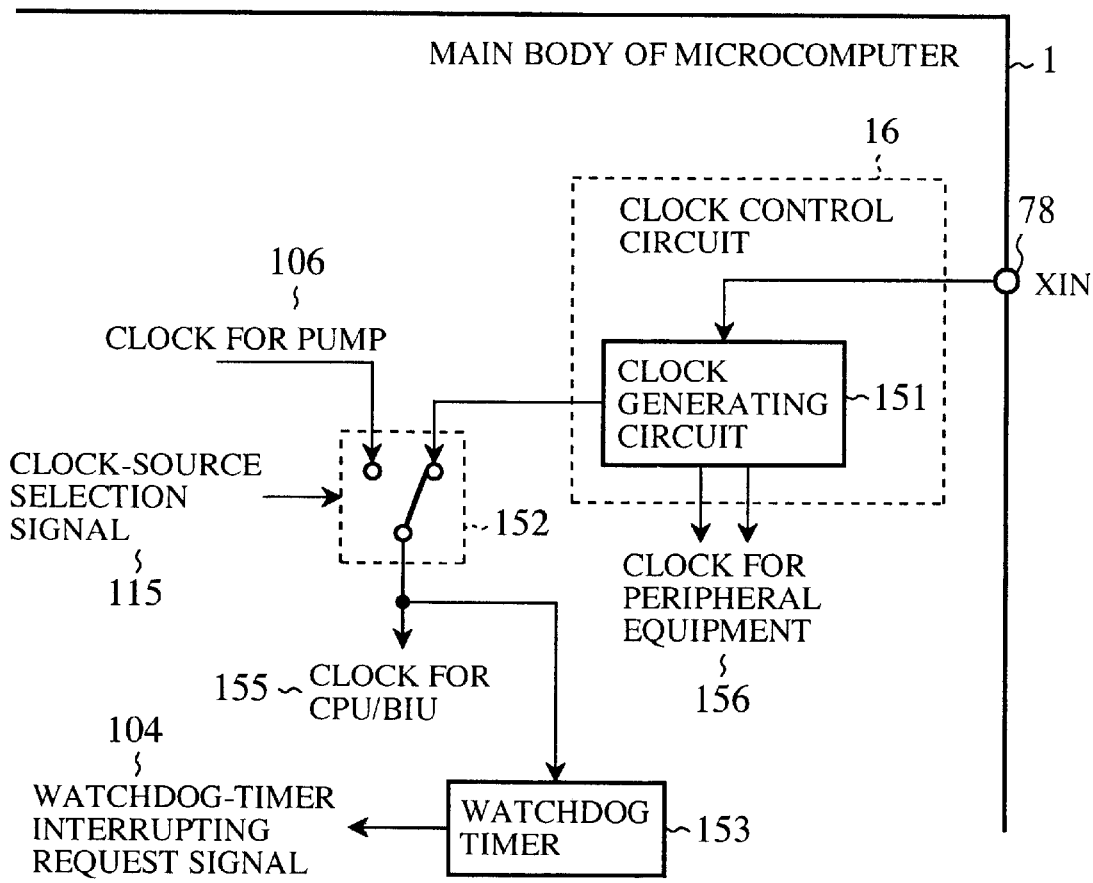
FIG. 9 is a block diagram illustrating a configuration of circuits relating to clock control.

Both of FIGS. 8 and 9 are block diagrams illustrating configurations of circuits related to clock control of the microcomputer 1. In FIGS. 8 and 9, reference numeral 24 is a voltage charge pump circuit. Reference numeral 36 is a clock oscillator for pump. Reference numeral 118 is an OR gate that performs OR operation of an oscillation request signal 108 from the voltage charge pump circuit 24 with an output 116 of bit 6 (clock-for-pump oscillation permission bit) of the sequence control register 32, and that inputs the ORed signal to the clock oscillator for pump 36. Reference numeral 153 is a watchdog timer. Reference numeral 104 is a watchdog-timer interrupting request signal that is output from this watchdog timer 153. Reference numeral 16 is a clock control circuit. Reference numeral 151 is a clock generating circuit for generating clocks 154 through 156 for CPU/BIU 3, for peripheral equipment, and for watchdog timer, from an inputted clock source. Reference numeral 152 is a clock selector that selects a clock, which is inputted from two input ends, in a state of an output (clock-source selection signal) 115 of an AND gate 113 for inputting an output of bit 5 (clock selection bit) of the sequence control register 32 and an output 116 of bit 6 (clock-for-pump oscillation permission bit), and that outputs the selected clock.

When writing from the CPU/BIU 3 to the watchdog timer 153 is performed (its writing bus is not shown in the figure), its count value is set as a maximum value, and decremented one by one by a clock for watchdog timer. When the count value becomes 0, the watchdog-timer interrupting request signal 104 becomes "H" (active). In this manner, FIG. 8 is an example of a configuration in which a clock source of a clock generating circuit 151 is selected by the clock selector 152. On the other hand, FIG. 9 is an example of a configuration in which a clock for CPU/BIU and a clock for watchdog timer are selected by the clock selector 152.

(Firmware Configuration and Operation Mode)

Next, a firmware configuration and operation modes according to the first embodiment of the present invention will be described with reference to the drawing.

Table 1 shown in FIG. 10 is a table of software commands that specify operation of a flash memory. This Table 1 shows a "block erase" command for erasing content of the flash memory for each specific block (block (0) 210 through block (4) 214 in FIG. 1), and a "(word) program" command for writing to a specified address on a base of one word (=2 bytes=16 bits). However, as a matter of course, commands other than those mentioned above (for example, a command relating to lock bit operation, and a command for test) may be added. In the case of the "block erase" command (hereinafter, it is abbreviated as "erase" command), a block top address (24 bits) and a command code (16 bits) are specified. In the case of the "(word) program" command (hereinafter, it is abbreviated as "program" command), a written address (24 bits), written data (16 bits), and command bits (16 bits) are specified.

Table 2 in FIG. 11 shows an error-status table, which indicates results of command execution or an illegal command input. An error status code is usually written to the status register 30 by rewriting control F/W. Software on the user side reads and clears content of the status register 30. In this connection, the error status code is allocated to bit 5 and bit 4 of the status register 30.

Figure 12:
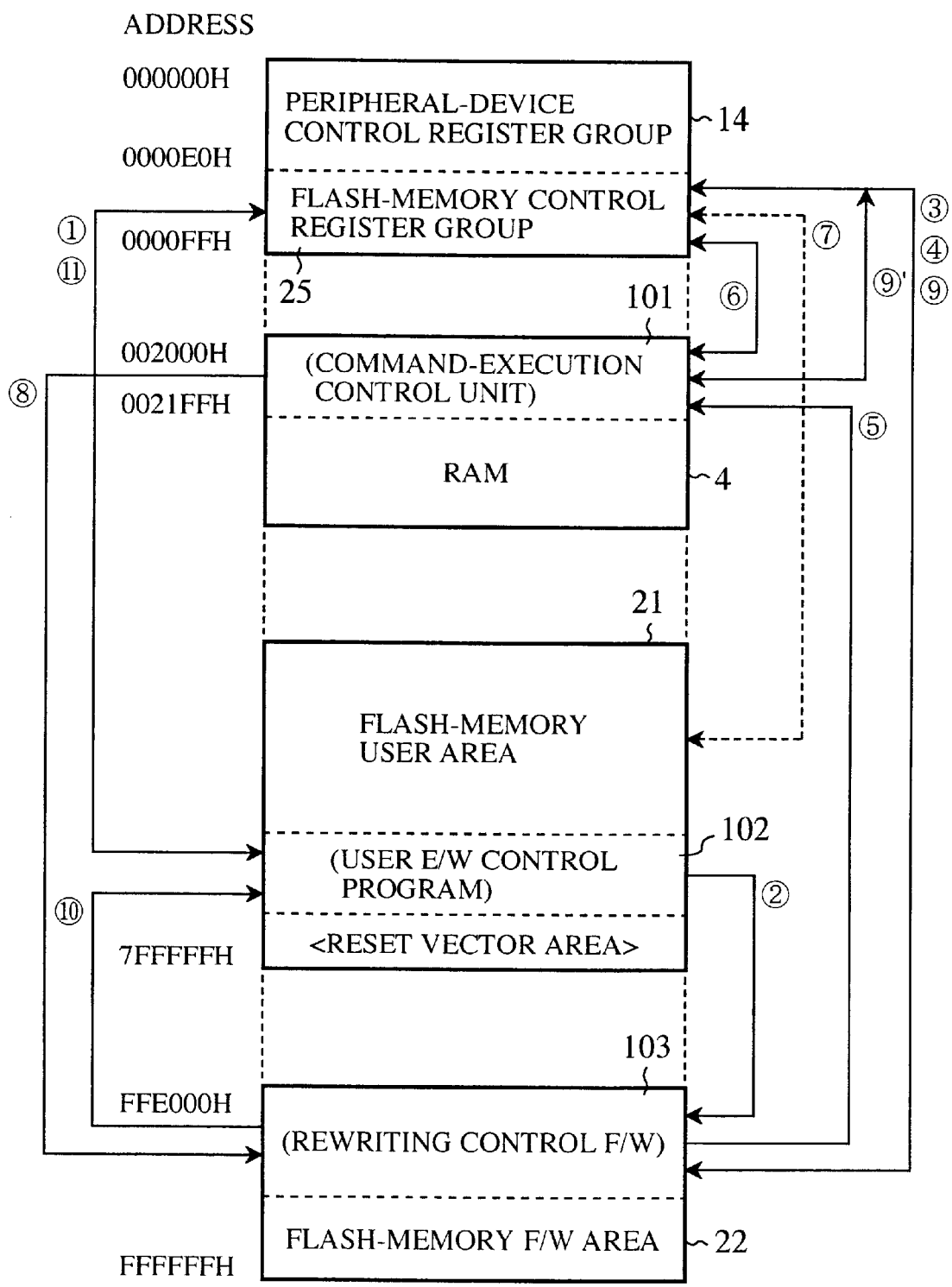
FIG. 12 is a diagram illustrating a memory map and operation order of rewriting control F/W.

FIG. 12 is a diagram illustrating a memory map of the microcomputer 1 and operation order of the rewriting control F/W. FIG. 12 shows placement of the following: a peripheral-equipment control register group 14 including the flash-memory control register group 25; the RAM 4; the flash-memory user area 21; and the flash-memory F/W area 22. In addition to it, FIG. 12 also shows the following: the rewriting control F/W 103 is stored in the flash memory F/W area 22; a user's E/W (erase/write) program 102 is stored in the flash-memory user area 21; and a command-execution control unit 101, which is a component of the rewriting control F/W 103, is transferred to the RAM 4.

It should be noted that, in the block diagram of the microcomputer 1 in FIG. 1, an address of the peripheral-equipment control register group 14 shows an address that is allocated to a control register in peripheral equipment including the port control block 11, the serial I/O 12, and the timer 13, and that is allocated to the flash-memory control register group 25. In addition, circle numbers 1 through 11 show order (that is, sequence) of operation of the rewriting control F/W.

Figure 13:
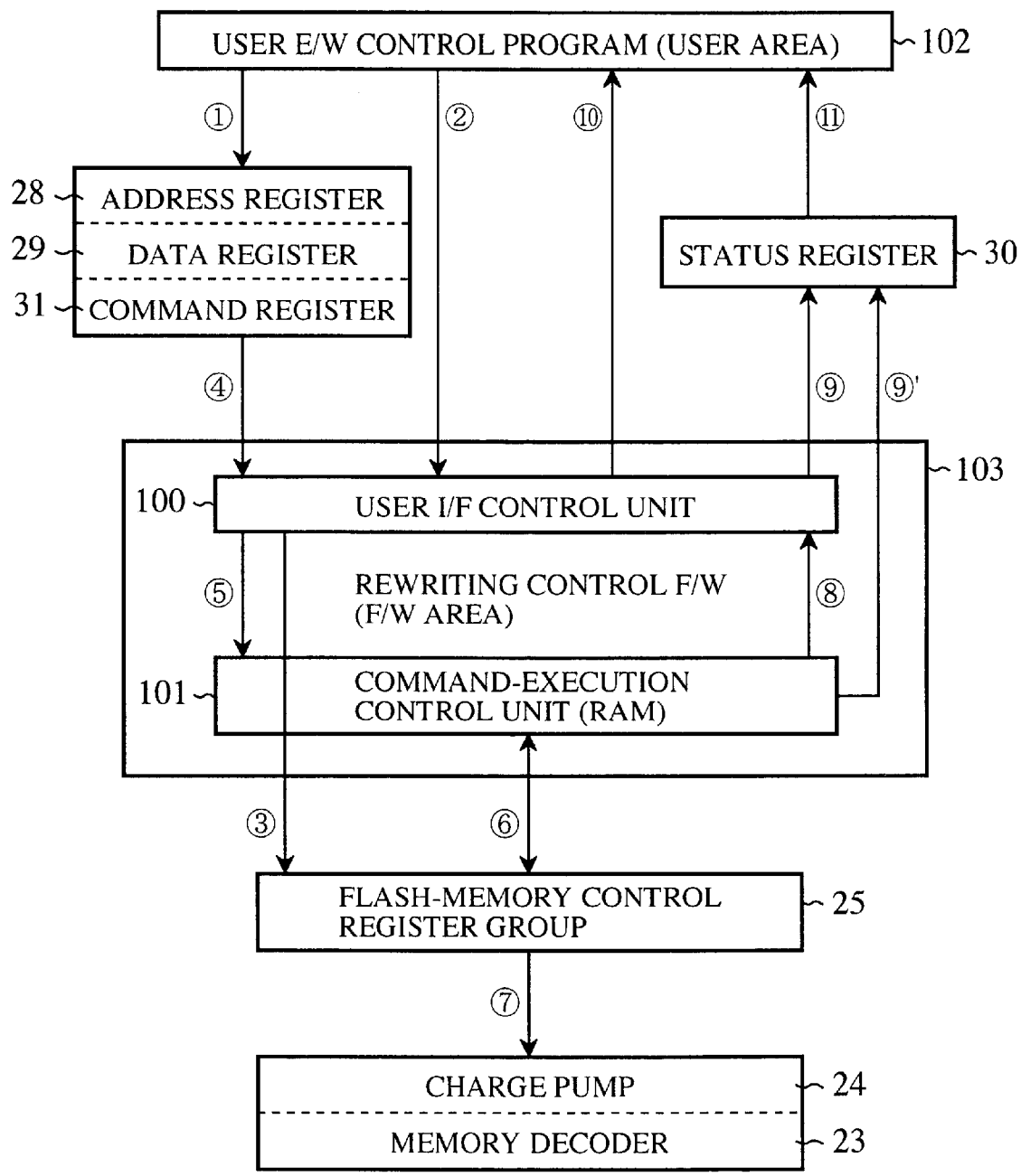
FIG. 13 is a diagram illustrating a configuration of rewriting control F/W and order of execution.

FIG. 13 is a diagram illustrating a configuration and execution procedure of the rewriting control F/W. In FIG. 13, the circle numbers 1 through 11 show order of operation of the rewriting control F/W, which is common to FIG. 9. In addition, it is shown by FIG. 13 that the rewriting control F/W 103 comprises a user I/F control unit 100 and the command-execution control unit 101.

Figure 14:
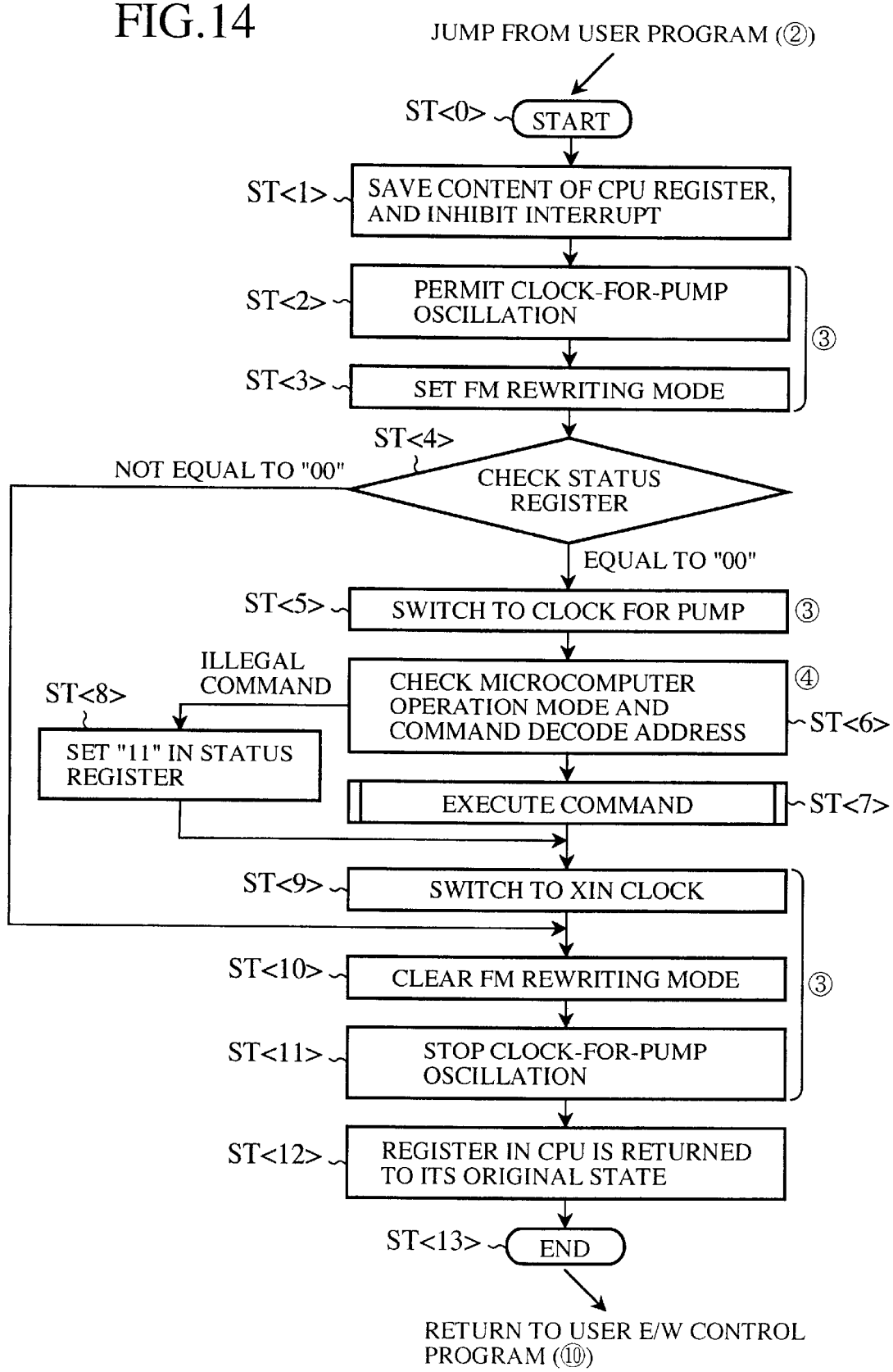
FIG. 14 is an operation flowchart of rewriting control F/W that is controlled by a user I/F control unit.
Figure 15:
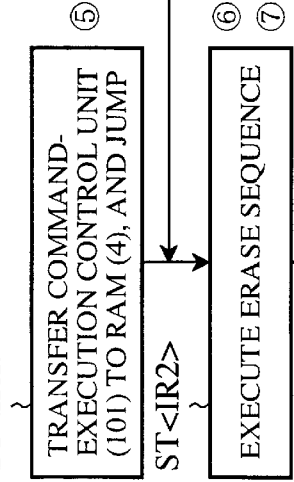
FIGS. 15A and 15B are operation flowcharts of rewriting control F/W that is controlled by a command-execution control unit.

FIG. 14 shows an operation flowchart of the rewriting control F/W that is controlled by the user I/F control unit. FIGS. 15A and 15B each show an operation flowchart of the rewriting control F/W that is controlled by the command-execution control unit 101. FIGS. 15A and 15B each correspond to a portion of command execution in FIG. 14. Additionally, circle numbers 1 through 11 in FIGS. 15A and 15B show order of operation of the rewriting control F/W, which is common to FIGS. 9 and 10.

Figure 16:
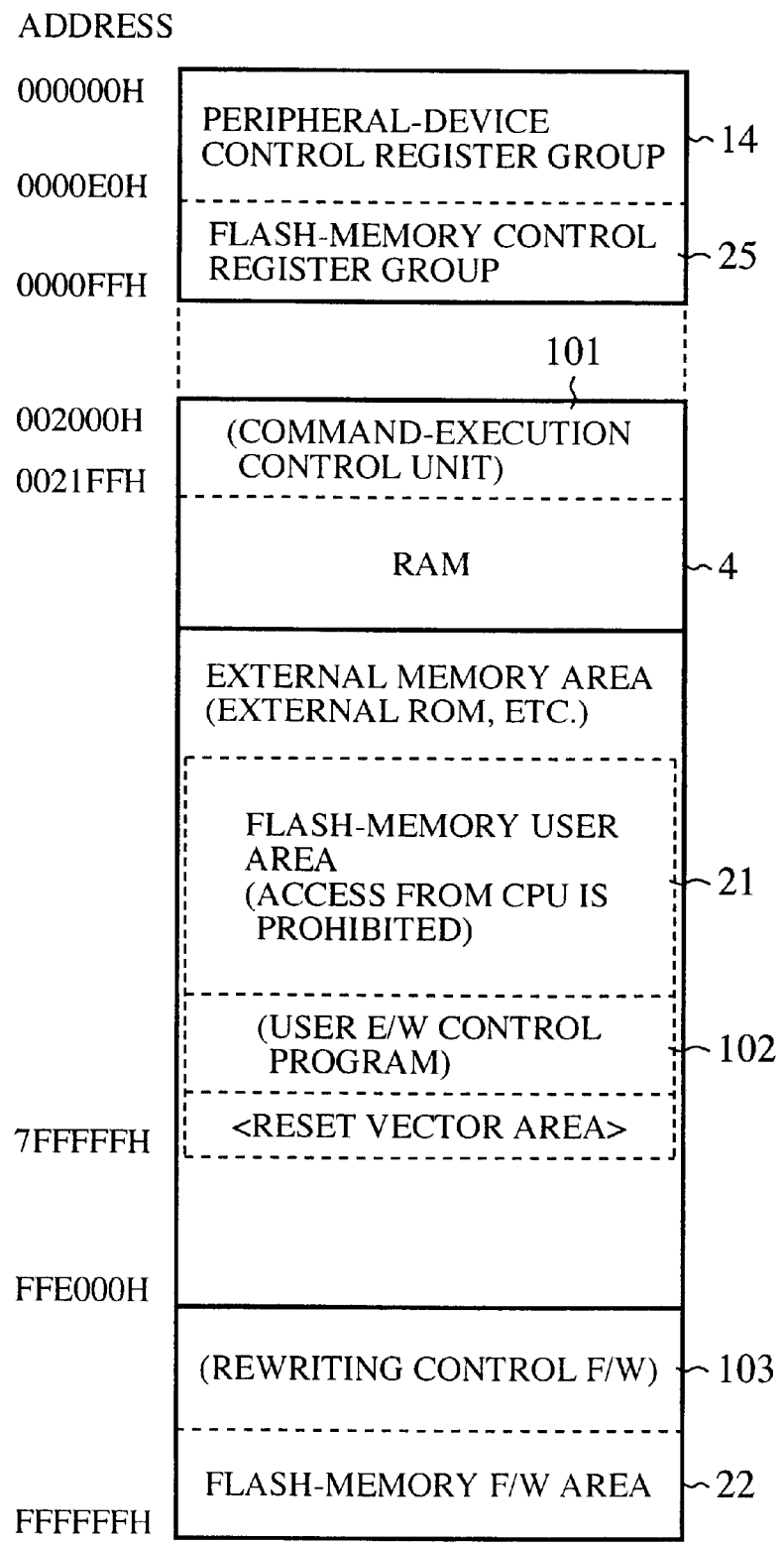
FIG. 16 is a memory map in a mode in which an external memory is used for operation.

FIG. 16 shows a memory map in an operation mode using an external memory of the microcomputer 1. The memory map of FIG. 16 differs from a memory map of FIG. 12 in a point that the flash-memory user area 21 is an external memory area. It should be noted that a user E/W control program 102 is stored in an external memory such as an external ROM.

Table 3 shown in FIG. 17 is a table of operation modes of the microcomputer 1. Besides modes for normal users, there are test modes for test and for chip evaluation. In these test modes, mainly a F/W area of a flash memory is rewritten. (Description of User-Area Rewriting Operation)

Next, concerning operation of a microcomputer with built-in flash memory according to the first embodiment of the present invention, rewriting control procedure by means of rewriting control F/W will be described with reference to mainly FIGS. 12 through 15A, B.

In the first place, concerning a microcomputer in which the rewriting control F/W 103 is written to the flash-memory F/W area 22 by means of a method described below, procedure, by which a user rewrites the flash-memory user area 21 using this microcomputer, will be described.

The user E/W control program 102 instructs the rewriting control F/W 103 to rewrite the flash memory using a program, which should be prepared on the user side, and then evaluates a result of the rewriting. To be more specific, as shown in FIG. 13, according to Table 1, which is a software command table, in order to specify content to be rewritten, and an address/a block, the following are performed: in a sequence ①, address setting in the address register 28, written-data setting in a data register (only at the time of program), and software-command setting in the command register 31; next, in a sequence ②, jumping to a top address of the rewriting control F/W 103 that is stored in the flash-memory F/W area 22.

Hardware operation of each command setting will be described with reference to FIG. 1. Concerning address setting (writing) in the address register 28, the following information (a write signal) is output to the R/W control line 7: the CPU/BIU 3 writes an address (0000E0h/E1h) corresponding to the address register 28 to the address line 6, and writes an address to be written to the data bus 6.

Next, writing to the address register 28 is performed. FIG. 6 is a diagram illustrating the address register 28 and its attached circuits. An address-E0h/E1h control circuit 128 finds out that a register controlled by the address-E0h/E1h control circuit 128 itself will be written, judging from an address (0000E0h/E1h) on the address line 6 and a write signal on the R/W control line 7. Then, the address-E0h/E1h control circuit 128 outputs the write signal to the address register 28. When this write signal becomes active, data (address to be written) on the data bus 5 is captured in the address register 28.

By the above-mentioned operation, the address setting (writing) in the address register 28 is completed. In this manner, setting in the data register 29 and the command register 31 can also be perform using a similar procedure. In passing, reading of each register can be described if the above-mentioned operation is read as follows: the above-mentioned write signal is changed to a read signal; and data is output not by the CPU/BIU 3 but by each register.

The rewriting control F/W 103 starts up by a jump (a sequence ②) from the user E/W control program 102, and operates according to a flow of rewriting-control F/W operation shown in FIG. 14.

To begin with, in a step ST<1>, content of a CPU register is saved (equivalent to data transfer to a specific area of the RAM 4) to prevent operation environment of the user E/W control program 102 from being overwritten (after that, in a step ST<12>, the register in the CPU is returned to its original state); and in addition to it, maskable interrupts are inhibited. For reasons of circuits, the flash memory cannot be read at the time of rewriting. Therefore, an interrupt vector, which exists in the flash-memory user area, cannot be read when an interrupt occurs. This necessitates the interrupt inhibit.

Next, in a sequence ③, as operation of the flash-memory control register group, clock-for-pump oscillation is permitted in a step ST<2>. In other words, "1" is written to bit 6 (clock-for-pump oscillation permission bit) of the sequence control register 32. As a result, a clock-for-pump oscillation permission signal 116 shown in FIGS. 4 and 8 becomes "H", and the OR gate 118 also becomes "H", thereby the clock oscillator for pump 36 starts oscillation. It should be noted that, because the clock oscillator for pump 36 is a self-excited oscillator including a ring oscillator as described above, a definite period of time is required for stable oscillation after starting oscillation. After a lapse of the definite period of time, the clock for pump 106 can be used.

Next, in a step ST<3>, a FM rewriting mode is set. To be more specific, "1" is written to a bit 4 (a FM rewriting mode bit) of the sequence control register 32. As a result, a FM rewriting mode signal 114 shown in FIGS. 4 and 3 becomes "H", and one of conditions for opening an AND gate 112 is satisfied. In other words, in processing of sequences ⑥ and ⑦, writing to the control-signal register for pump/memory decoder 26 causes a write signal to this register to be transferred, and enables writing. In addition, although it is not shown in the figure, it is also possible to cancel operation prohibition of hardware circuits for rewriting control by the FM rewriting mode signal 114.

Next, in a step ST<4>, the status register 30 is read, and whether or not bits 5 and 4 of this register are cleared to "00" is checked. If a read value is "00" (a state after reset, or a state at the time of normal termination of a command: refer to Table 2), then the process proceeds to processing, that is, a step ST<5>. On the other hand, if the read value is a value other than "00", it is found out that prior processing caused some error, and that the user has not dealt with the error. Therefore, without performing anything, the process proceeds to a step ST<10>, where the FM rewriting mode is cleared.

During FM rewriting mode setting of the step ST<3> and status-register checking of the step ST<4>, oscillation of the above-mentioned clock oscillator for pump 36 is stabilized.

Next, in a step ST<5>, the clock for pump is switched. To be more specific, "1" is written to a bit 5 (a clock-source selection bit) of the sequence control register 32. As a result, an AND gate output signal 115 (equal to a clock-source selection signal) shown in FIGS. 4, 8, and 9 becomes "H". The clock selector 152 is switched to the above-mentioned clock for pump 106. The clock-source selection signal 115 becomes "H" (the clock for pump 106 is switched) only when both of the clock-for-pump oscillation permission bit and the clock-source selection bit are "1". The clock for pump cannot be switched only by the clock-source selection bit.

In the case of circuits shown in FIG. 8, concerning the clock selector 152, switching of a clock source changes both of a clock for CPU/BIU and peripheral device 154, which is generated by the clock generating circuit 151, and a clock for watchdog timer to a clock derived from the above-mentioned clock for pump 106. In other words, movement of the microcomputer 1 at the time of rewriting does not depend on a clock frequency that is used by the user.

In addition, in the case of circuits shown in FIG. 9, concerning the clock selector 152, switching of a clock source changes both of a clock for CPU/BPU 155 and a clock for watchdog timer to a clock derived from the above-mentioned clock for pump 106. A clock for peripheral device 156 does not change. To be more specific, at the time of rewriting, operation of the CPU/BIU 3 and the watchdog timer 153 does not depend on a clock frequency that is used by the user, while the peripheral device continues its operation under user's use conditions.

Next, command decoding including microcomputer operation-mode check, and address decoding in a step ST<6> is performed. This is equivalent to a sequence ④ of FIG. 13. The microcomputer operation mode is checked in the following manner: the CPU/BIU 3 reads states of operation-mode selection terminals MD (0) 88 and MD (1) 89, shown in FIG. 1, through the port control block 11. In this case, a user mode shown in Table 3 is assumed. If a command such as the "erase" command and the "program" command is set in an operation mode in which rewriting of the flash memory is prohibited, the command is judged to be an illegal command.

Command decoding (including address decoding) is performed in the following manner: the CPU/BIU 3 reads the command register 31, the address register 28, and the data register 29 in order, and judges according to Table 1 in FIG. 10. To begin with, all of the 16 bits are checked to judge whether or not content of the command register 31 is a specified command. If the content is a code that is not specified, the command is judged to be an illegal command. In the case of the "block erase" command, all of the 24 bits are checked to judge whether or not content of the address register 28 is one of top addresses of blocks 210 through 214. If the content is an address other than those addresses, the command is judged to be an illegal command. In the case of the "program" command, all of the 24 bits are checked to judge whether or not content of the address register 28 is an address of the user area 21. If the content is not the address of the user area 21, the command is judged to be an illegal command.

When the command is judged to be a legal command, the process proceeds to the next step ST<7>, that is, command execution. When the command is judged to be an illegal command, a code "11" as an illegal command is set in the status register 30 in a step ST<8>, and then the process proceeds to a step ST<10>, that is, clearing FM rewriting mode.

Processing of the steps ST<1> through <6> and <8> described above belongs to the user I/F control unit 100 in the rewriting control F/W 103. Command execution of the next step ST<7> belongs to the command-execution control unit 101. This command-execution control unit 101 comprises a F/W group for each software command.

With reference to a flow of rewriting control F/W operation shown in FIGS. 15A, B, flows of "block erase" command execution in FIG. 15A, and "program" command execution in FIG. 15B will be described. Because every command rewrites the flash memory, F/W reading from the flash memory cannot be performed. Therefore, it is necessary to transfer actual command execution F/W to the RAM 4 in order to execute it in the RAM 4.

In the case of the "block erase" command execution in FIG. 5A, to begin with, in a step ST<IR1>, an erase command execution unit F/W of the command-execution control unit 101 is transferred to a given address of the RAM 4, and a jump to its top address is performed. Accordingly, the "erase" command is executed using F/W on the RAM 4 thereafter. As a result, the flash memory (its F/W area) is not read.

Next, an erase sequence of a step ST<IR2> is executed. This is processing that corresponds to sequences ⑥ and ⑦ shown in FIG. 13. To be more specific, rewriting setting values of the control-signal register for pump/memory decoder 26 and the signal-output control register 27 successively according to a given erase sequence permits control signals 40 and 41, which are supplied to the voltage charge pump circuit 24 and the memory decoder 23, to be changed for the purpose of performing erase operation. In order to change the control signals 40 and 41, in the first place, data to be output next is written to the control-signal register for pump/memory decoder 26. Next, dummy writing to the signal-output control register 27 is performed with a given change timing. It should be noted that, as shown in FIG. 3, because a write signal to the control-signal register for pump/memory decoder 26 is output from the AND gate 112, it is necessary to set "1" to a bit 4 (FM rewriting mode bit) of the sequence control register 32 before writing to the control-signal register for pump/memory decoder 26.

In order to perform the dummy writing to the signal-output control register 27 in response to the given change timing provided by the above-mentioned erase sequence, time measurement is required. The timer register for pump 33 is used for the time measurement. To begin with, a count value is written to bits 0 through 14 of the timer register for pump 33, and "1" is written to a bit 15 as a count starting bit. As a result, counting (decrementing) starts while synchronizing with the timer clock for pump 106. When the counter value becomes "0", the count starting bit automatically becomes "0". Therefore, if this bit is repeatedly checked (polling) by the rewriting control F/W, termination of the counting can be recognized.

In FIG. 3, writing to the control-signal register for pump/memory decoder 26 is performed in a manner similar to writing to the above-mentioned address register 28. The dummy writing to the next signal-output control register 27 causes a signal-output signal to be outputted from an EE address R/E control circuit 127. Because the control-signal register for pump/memory decoder 26 is configured in such a manner as shown in FIG. 5, a state of the data bus 5 is read by a write signal. Then, the state is output from the register as control signals 40 and 41 at the time of the next signal output. It should be noted that an initial value after reset of the control-signal register for pump/memory decoder 26 is set to a state in which the voltage charge pump circuit 24 and the memory decoder 23 do not perform rewriting such as "erase" and "program".

Moreover, specification of a block to be erased is transferred from the address register 28 to the memory decoder 23 through the address line 42 in the flash memory in FIG. 1.

After completing the "erase", in a step ST<IR3>, verification after the "erase" is performed to check whether or not the "erase" is successfully completed. The verification after the "erase" is started by writing "1" to a bit 0 (verification starting bit) of the sequence control register 32. At the time of the verification after the "erase" using the address incrementor 228 that is attached to the address register 28 shown in FIG. 6, addresses are generated successively starting from the first address of the erased block, and then transmitted to the memory decoder 23. The compare circuit 35 reads out each address of the flash memory, and reads its result through the data bus 43 in the flash memory, and then compares the result with an erasure expectation value ("1"). If the result is not equal to the erasure expectation value, "1" is set to a bit 1 (verification status) of the sequence control register 32.

This verification status is read by an erase command execution unit F/W to check a verification result. If the result is OK, the process proceeds to a step ST<IR6>, that is, returning from the RAM 4. If the result is NG, whether or not the "erase" has been executed a given number of times is checked in a step ST<IR4>. If the execution of the "erase" does not reach the given number of times, the process returns to the step ST<IR2>, that is, executing an erase sequence. If the execution of the "erase" reaches the given number of times, it is judged to be an erase error. In response to the judgment, an erase error code "10", is set to bits 5 and 4 of the status register 30 in a step ST<IR5> (a sequence ⑨'). After that, the process proceeds to the step ST<IR6>, that is, returning from the RAM 4.

(b) In the case of the program command execution, how the program command is executed is basically similar to the above-mentioned case, in which the block erase is executed, except the following differences: a specific procedure for executing a program sequence of the step ST<PR2>; a specific procedure for verification after program of the step ST<PR3>; and an error code that is set in the status register 30 of the step ST<PR5>.

In addition, concerning the program sequence execution of the step ST<PR2>, rewriting setting values of the control-signal register for pump/memory decoder 26 and the signal-output control register 27 successively according to a given program sequence permits control signals 40 and 41, which are supplied to the voltage charge pump circuit 24 and the memory decoder 23, to be changed for the purpose of performing program operation. The procedure for changing the control signals 40 and 41 is the same as the case of the block erase.

Moreover, data to be programmed is transferred from the data register 29 to the memory decoder 23 via the data bus 43 in the flash memory shown in FIG. 1.

Concerning the verification after program of the step ST<PR3>, dedicated circuits are not used. The verification after the "program" is performed in the following manner: the CPU/BPU 3 reads an appropriate address of the flash memory, and comparing it with the written value. If the result is OK, the process proceeds to a step ST<PR6>, that is, returning from the RAM 4. If the result is NG, whether or not the "program" has been executed a given number of times is checked in a step ST<PR4>. If the execution of the "program" does not reach the given number of times, the process returns to the step ST<PR2>, that is, executing a program sequence. If the execution of the "program" reaches the given number of times, it is judged to be a program error. In response to the judgment, a program error code "01" is set in bits 5 and 4 of the status register 30 in a step ST<PR5>. After that, the process proceeds to the step ST<PR6>, that is, returning from the RAM 4.

As a result of returning from the RAM 4 of the step ST<IR6>, or returning from the RAM 4 of the step ST<PR6>, the process moves to the original user I/F control unit 100 (stored in the F/W area 22 of the flash memory) to perform the following in order: switching to XIN clock for moving of a step ST<9>; clearing FM rewriting mode-of the step ST<10>; and stopping clock-for-pump oscillation of a step ST<11>. To be more specific, "0" is written to bits 5, 4, and 6 of the sequence control register 32 respectively. (Because each operation is the opposite of the step ST<2>, ST<3>, or ST<5> described above, description is omitted.)

Finally, the register in CPU is returned to its original state in the step ST<12>. To be more specific, content of the register in CPU is saved in a specific area of the RAM 4 in the step ST<1> (that is, saving content of the register in CPU) before data is returned (transferred) to the original register in CPU. After that, the process returns to an instruction immediately after the jump instruction, which has performed the jump of the user E/W control program (sequence ②). Up to this point, the processing of the rewriting control F/W finishes.

After returning, in the user E/W control program 102, the status register 30 is read in a sequence circle number 11 to check a result of an executed item of the command.

Using the procedure described above, rewriting of a user area of the flash memory is performed. In this connection, data to be programmed is inputted from, for example, the personal computer 91 shown in FIG. 1 via the serial I/O 12.

Next, if the CPU 3 of the microcomputer 1 runs away while executing the rewriting control F/W causing a watch-dog timer interrupt request 104 to be outputted (because periodical writing (setting of a count value) to the watchdog timer is not performed), an interrupt control circuit, which is not shown in the figure, performs given interrupt processing (saving content of the register in CPU, jumping to an interrupt vector address for watchdog timer interrupt (in the user area of the flash memory), and the like). Moreover, reset signals, which are output by the OR gates 111 and 117 shown in FIGS. 3 and 4, become "1". The reset signals reset the control-signal register for pump/memory decoder 26 and the sequence control register 32 respectively. As a result, the voltage charge pump circuit 24 and the memory decoder 23 discontinue the rewriting operation. In addition to it, the FM rewriting mode is cleared; the clock is switched to the XIN input side; and the flash memory returns to a state in which the flash memory can be read from the CPU/BIU3.

Although the first embodiment described above has a normal register structure in which an address is allocated to the command register 31, the address can also be allocated to the accumulator in the CPU 3. In this case, the user sets a command in the accumulator.

Although the first embodiment described above has a normal register structure in which addresses are allocated to the command register 31 and the status register 39, either or both of the addresses can also be allocated to a specific address in the RAM 4.

(Description of Microcomputer Operation Modes and a Method for Rewriting a F/W Area)

In the above-mentioned description, the method of rewriting the user area using the rewriting control F/W, which is stored in the F/W area 22 of the flash memory, was described. A method for rewriting the F/W area itself, and operation modes of the microcomputer in relation to the method will be described hereinafter.

Table 3 in FIG. 17 shows a list of operation modes of the microcomputer 1. As regards this table, each operation mode is selected by a voltage level that is applied to the operation-mode selection terminals MD (1), MD (0) from outside. Each operation mode is different from each other in the following conditions: whether or not the flash memory can be read from the CPU; whether or not the flash memory can be rewritten; and where a reset vector address is allocated. It should be noted that, in Table 3, symbols "○" and "X" indicate that reading or rewriting is permitted, and that reading or rewriting is prohibited, respectively. Control of the enabling/disabling of reading from a CPU and control of the allocation of the reset vector address are performed in the hardware control circuit in the CPU/BIU 3. On the other hand, the rewriting control of the flash memory is performed in rewriting control F/W. As a result, the rewriting control F/W reads the operation-mode selection terminals MD (1) and MD (0) (through the port control block 11) to determine the operation mode.

Next, each operation will be described. In the user mode, the F/W area 22 can be read (that is to say, rewriting by the rewriting control F/W is permitted). However, the F/W area itself cannot be rewritten (that is to say, the F/W area is protected). The reset vector exists in the user area 21. This is a mode that is usually used by the user.

a memory map in this user mode will be shown in FIG. 12. It should be noted that, in FIG. 12, an external memory area can also be allocated to the peripheral-device register group 14, the RAM 4, the user area 21, and the F/W area 22. In this case, as shown in FIG. 1, the external memory 90 can be connected from the external-data-bus terminal 85, the address-line terminal 86, and the R/W-control-line terminal 87 via the external-data-bus line 95, the address line 96, and the R/W control line 97.

A test mode 1 is the same as the above-mentioned user mode except that the F/W area 22 itself can be rewritten. Because the reset vector is in the user area, start-up after reset is performed by software in the user area 21. After the rewriting control F/W in the F/W area 22 is transferred to the RAM 4, the F/W area is rewritten using this F/W. This is a mode based on the assumption that the F/W will be changed in midstream.

A test mode 2 is an operation mode based on the assumption that the external memory 90 will be connected. In this mode, the user area 21 cannot be read. Instead of it, the external memory area can be accessed using the same address as that of the user area 21. What is more, the reset vector is allocated to this external memory area. A memory map in this test mode 2 will be shown in FIG. 16. In this mode, not only the reset vector and the user control program (or the E/W control program equivalent to it), but also the rewriting control F/W is stored in the external memory 90.

After resetting, the E/W control program performs rewriting. In this case, the rewriting control F/W in the external memory 90 is started up. In this mode, rewriting of the F/W area 22 is permitted. Therefore, the F/W area 22 can be used for a first F/W writing to the F/W area of the flash memory. If a tester is connected instead of the external memory 90 to operate the microcomputer using this tester, the rewriting control F/W can be written to the F/W area 22 using the tester at the time of shipment of the microcomputer.

In addition, in this test mode 2, it is possible to store the reset vector and the user E/W control program (or the E/W control program equivalent to it) in the external memory 90, and to rewrite the user area using the rewriting control F/W stored in the F/W area 22.

In the test mode 2 described above, the user area 21 cannot be read. Instead of it, the external area can be accessed using the same address as that of the user area 21. What is more, the reset vector is allocated to this external area. This shows that reading of the user area 21 is permitted. However, the following mode may be created: the reset vector is set by moving the reset vector to, for example, a specific address of the external memory area between the user area 21 and the F/W area 22 (between addresses 800000h and FFDFFFh). In this case, the external memory 90 is given to an address that includes the above-mentioned reset vector. Not only the reset vector and the user E/W control program (or the E/W control program equivalent to it), but also the rewriting control F/W are stored in the external memory 90.

A test mode 3 is a mode for writing the rewriting control F/W to the F/W area 22 using a test at the time of shipment of the microcomputer. In a reset state in which "L" is applied to the /RESET terminal 79 in this mode, direct writing and reading to the RAM 4 from the external-data-bus terminal 85, the address-line terminal 86, and the R/W-control-line terminal 87 are possible. In this state, the reset vector and the user E/W control program (or the E/W control program equivalent to it), and the rewriting control F/W, are written from the tester (that is connected instead of the external memory 90 of FIG. 1) to the RAM 4.

Next, when setting a level of the /RESET terminal 79 to "H" to clear the reset, the CPU/BIU 3 of the microcomputer 1 starts operation, and then operates using the reset vector on the RAM 4 and the E/W control program. Rewriting of the flash memory is similarly performed using the rewriting control F/W on the RAM 4. In this mode, rewriting of the F/W area 22 is permitted. Therefore, the F/W area 22 can be used for a first F/W writing to the F/W area of the flash memory.

As regards the commands for rewriting the F/W area 22 in the test modes 1 through 3 in which the above-mentioned F/W area 22 can be rewritten, a "block erase" command and a "program" command designed specially for F/W, which are not the "block erase" command and the "program" command for usual use, may be used. In addition, the following configuration may also be possible: for example, a protection cancel command is defined; and only after execution of this command, the "block erase" command and the "program" command (for usual use) are enabled (such function is provided for the rewriting control F/W).

It should be noted that, in the first embodiment described above, a case in which the flash memory is used as a nonvolatile memory is described. However, even when an EEPROM or a high-field memory is used, similar effects can be expected.

As described above, according to this first embodiment, the microcomputer comprises: a flash memory for storing rewriting control firmware (sequence F/W) and user software; a command specifying means (a command register) for specifying content of rewriting control; a means for specifying an address to be subjected to rewriting control (an address register); a data specifying means (a data register) for specifying data to be written; a power-supply pump circuit in flash memory; and a control-signal setting means (a control signal register) for specifying/outputting a control signal to a memory decoder. The CPU of the microcomputer is capable of accessing these four setting means (registers) to perform writing or reading. Each bit of the control signal register corresponds to each control signal. A value written to this becomes a control signal that will be directly supplied to both of a power supply circuit in the flash memory, and the memory decoder, to control them.

By rewriting a set value of this control signal register using the rewriting control F/W according to a specified sequence, processing such as "erase" and "program" (write) of the flash memory are performed.

In addition, when rewriting the flash memory, user software (S/W) sets required information in a command register, and in the address register and the data register as necessary, before invoking the F/W (jumping to a F/W stored address).

In addition, the rewriting control F/W reads information that has been set in these registers. Next, according to a sequence specified for each command (an order and time), the rewriting control F/W writes a required set value based on the control signal register.

When command execution is completed, the F/W returns to the user S/W that has invoked the F/W. It should be noted that the flash memory has a plurality of blocks as erasure units. The rewriting control F/W is stored in a block other than blocks for the user software.

As described above, the microcomputer with built-in flash memory is configured in the following manner: the conventional automatic sequence circuit (A) is changed to the control signal register (B); and its sequence operation is performed by F/W in the flash memory (C). In this case, a layout area S is expressed as follows: S(A)>(S(B)+S(C)). This means that the layout area S can be decreased. Therefore, removing of the automatic sequence circuit produces an effect of achieving decreases in a layout area and in cost.

In addition, the rewriting control F/W is equipped. The rewriting control F/W performs processing such as transfer of a rewriting program to the RAM, which was conventionally, and partially, performed by the user using F/W provided on the vendor side. This produces an effect of simplifying S/W on the user side.

Moreover, the sequence control is performed not by H/W but by F/W that can be easily rewritten. Therefore, a change in a sequence (an order and time) is facilitated, which produces an effect of permitting a most suitable sequence for finish of a flash memory to be provided.

As described above, according to the present invention, a microcomputer with built-in programmable nonvolatile memory is provided. Said microcomputer comprises:

a nonvolatile memory for storing rewriting control firmware and user software in separate unit blocks respectively;

at least the following four registers, which can be written or read by a CPU of the microcomputer:

a command register for specifying content of rewriting control;

an address register for specifying an address to be subjected to rewriting control;

a data register for specifying data to be written; and a control signal register for specifying a power-supply pump circuit in a nonvolatile memory and a control signal to a memory decoder.

As a result, a given bit of the control signal register controls the power-supply pump circuit and the memory decoder corresponding to a control signal supplied to the power-supply pump circuit and the memory decoder; the rewriting control firmware operates the power-supply pump circuit and the memory decoder by reading values, which have been set in the command register, the address register, or the data register, and rewriting a set value of the control signal register according to a sequence specified for each command corresponding to the set value. This permits rewriting processing including "erase" and "program" of a nonvolatile memory to be performed.

Therefore, there are exhibited the following effects:

(1) Removing of an automatic sequence circuit, which was conventionally required, decreases a layout area resulting in low cost.

(2) A rewriting sequence can be changed easily for bug fixing and for adapting the rewriting sequence to wafer process most suitably.

(3) Equipping with the rewriting control firmware reduces a load of user software, and also shortens a software development period.

According to the present invention, a unit block for storing the rewriting control firmware and a unit block for storing the user software are configured so that addresses of both blocks are not consecutive. This prevents the rewriting control firmware from being erased by mistake. Such mistake is caused by an addressing mistake, etc. of the "erase" command and the "program" command. Or, keeping a block used for a firmware area closed produces an effect of concealing the rewriting control firmware.

According to the present invention, the microcomputer with built-in programmable nonvolatile memory comprises a status register that can be written or read by a CPU, wherein after completion of rewriting processing that includes "erase" and "program", the rewriting control firmware writes a result of the execution into the status register. Therefore, the following effect is produced: after returning to the user E/W (erase/write) control program, the user E/W control program can check whether a specified command has been completed successfully, or it has terminated abnormally.

According to the present invention, the rewriting control firmware comprises a user interface control unit for decoding at least a command that is set in the command register, and a command-execution control unit for controlling the power-supply pump circuit and the memory decoder for each specified command; and firmware of this command-execution control unit is transferred to a built-in RAM, and is executed on this RAM. As a result, the user E/W control program is not required to support command specification and processing after command execution except status check. This eliminate the need for transferring the rewriting control software, which was conventionally required, to the RAM, the need for setting of the rewriting mode, and the like. As a result, an effect of minimizing a load on the user side is produced.

Moreover, separating into two portions, that is, the user control unit and the command execution unit described above, produces an effect of facilitating maintenance of the rewriting control firmware for an addition of a command and for a change in a command.

According to the present invention, the rewriting control firmware is configured to start up as a result of a jump from the user software to a top address of the rewriting control firmware, and to return to a next instruction of the jump instruction in the user software after command execution is completed. As a result, the user E/W control program is not required to support command specification and processing after command execution except status check. This eliminates the need for termination check of the command execution, which was conventionally performed by polling of a status bit indicating a state of the command execution. As a result, an effect of minimizing a load on the user is produced.

According to the present invention, in the case of an "erase" command, the rewriting control firmware executes the "erase" and verification after the "erase" consecutively; in the case of a "program" command, the rewriting control firmware executes the "program" and verification after the "program" consecutively; and if a result of the verification is abnormal, it is judged to be an erase error or a program error respectively. Therefore, a series of "erase" operation or "program" operation is automatically performed if the operation is viewed from the user side. As a result, the user E/W control program is not required to perform verification, which produces an effect of facilitating software development.

According to the present invention, the rewriting control firmware sets a result of command execution including "erase" and "program" in the status register; and if a command, which is not a legal command code, or an address, which is not allowed to be specified, is specified in the command register or in the address register, an error code indicating an illegal command is set in the status register, and in this case, processing is not be performed hereafter. This produces an effect of preventing malfunction caused by a mistake in specifying a command or an address in the user E/W control program. In addition, warning the user E/W control program of the error code produces another effect of facilitating debugging on the user side.

According to the present invention, the rewriting control firmware does not clear the status register, and reads the status register before executing a command that is set in the command register; and if a result of the status reading is an error code other than normal termination, the rewriting control firmware does not perform processing hereafter. This produces an effect of preventing a next command from being executed without checking by the user (the user E/W control program) whether or not command execution has been terminated in an abnormal state.

According to the present invention, a number of bits of a command code, which should be written to the command register, ranges from 12 to 16. Moreover, the rewriting control firmware decodes all of the bits of this command code. This produces effects of improving redundancy of a command code to a large extent, and decreasing probability of occurrence of malfunction caused by inputting a command by mistake.

According to the present invention, a number of bits of an address, which should be written to the address register, is taken more than a number of bits of an address that can specify a nonvolatile memory space. Moreover, the rewriting control firmware decodes all of the bits of this address. This produces effects of improving redundancy of an address, and decreasing probability of occurrence of malfunction caused by inputting an address by mistake.

According to the present invention, the microcomputer with built-in programmable nonvolatile memory comprises a nonvolatile-memory rewriting-mode selection bit that can be set by the CPU, wherein the control signal register can be rewritten when a specific value is written to this rewriting-mode selection bit. This produces an effect of preventing the flash memory from being rewritten illegally as a result of illegal writing to the control signal register caused by runaway of CPU and wrong use by the user (a software mistake), or the like.

According to the present invention, the control signal register is a register that can be set by the CPU; and a control signal, which is output from the control signal register, resets the power-supply pump circuit and the memory decoder by a reset signal, to a state in which rewriting is prohibited. This produces an effect of preventing the flash memory from being rewritten illegally at the time of resetting or at the time of clearing reset.

According to the present invention, the control signal register is a register that can be set by the CPU; and a control signal, which is output from the control signal register, resets the power-supply pump circuit and the memory decoder by a watchdog-timer interrupt signal, to a state in which rewriting is prohibited. This produces an effect of decreasing a possibility that a nonvolatile memory is illegally rewritten in the event of CPU's runaway at the time of rewriting the nonvolatile memory by the rewriting control firmware.

According to the present invention, the nonvolatile memory rewriting-mode selection bit is configured to be reset to a state, in which a non-rewriting mode is specified, not only by a reset signal of the microcomputer but also by the watchdog-timer interrupt signal. This produces an effect of decreasing a possibility that the nonvolatile memory is illegally rewritten by the rewriting control firmware.

According to the present invention, the accumulator in CPU is configured to be allocated as a command register. As a result, as compared with the case in which a command register is implemented using a usual register structure that allocates an address, a procedure for reading its content is omitted. This produces an effect of performing command decoder processing at higher speed. Moreover, it is not necessary to place an additional register, which produces another effect of avoiding expansion of a circuits scale and a layout area.

According to the present invention, both or either of the command register and the status register is allocated not to registers but to specific addresses in the built-in RAM. As a result, as compared with the case in which these registers are implemented by a usual register structure that allocates an address, an effect of reducing expansion of a circuit scale and a layout area to a large extend is produced.

According to the present invention, the microcomputer with built-in programmable nonvolatile memory comprises a dedicated timer circuit used when the nonvolatile memory is rewritten. As a result, as compared with a software timer that measures time by counting a number of times a program loops, an effect of enabling achievement of time measurement with high accuracy is produced.

In addition, there is another effect of enabling the user to use a timer, which is equipped in the microcomputer as a regular peripheral circuit, during rewriting the nonvolatile memory.

According to the present invention, the microcomputer with built-in programmable nonvolatile memory comprises a clock switching circuit for switching an operation clock source for the CPU and the peripheral device to a clock inputted from a clock terminal or to a clock generated by a built-in self-excited oscillator, wherein: these clocks are switched according to a state of the clock-source selection bit that can be set by the CPU; and at the time of rewriting of the nonvolatile memory, a clock on the self-excited oscillator side is selected. As a result, time setting, which does not depend on the user, becomes possible. This produces an effect of facilitating development and adjustment of rewriting control firmware.

According to the present invention, the microcomputer with built-in programmable nonvolatile memory comprises a clock switching circuit for switching an operation clock source for the CPU to a clock inputted from a clock terminal or to a clock generated by a built-in self-excited oscillator, wherein: these clocks are switched according to a state of the clock-source selection bit that can be set by the CPU; and at the time of rewriting of the nonvolatile memory, a clock on the self-excited oscillator side is selected as an operation clock source for the CPU, while a clock source for peripheral devices such as a timer and a serial I/O is not switched from the clock inputted from the clock terminal. As a result, performing time measurement during rewriting not by a XIN input clock, of which frequency is different for each user, but by a clock on the self-excited oscillator side, of which frequency is always constant, enables time setting that does not depend on user's use conditions. This produces an effect of facilitating development and adjustment of the rewriting control firmware.

Moreover, because operation speed of the peripheral device is kept in a state at the time of user software execution, the operation speed can be used as it is without changing clock set values of the peripheral devices such as the timer and the serial I/O even when rewriting the nonvolatile memory. Therefore, when performing write (program) by turns while executing the user E/W control program and the rewriting control firmware alternately, there is an effect of permitting next data, which should be written, to be received from the serial I/O automatically.

According to the present invention, the microcomputer with built-in programmable nonvolatile memory comprises a clock switching circuit for switching an operation clock source for the CPU and a watchdog timer to a clock inputted from a clock terminal or to a clock generated by a built-in self-excited oscillator, wherein: these clocks are switched according to a state of the clock-source selection bit that can be set by the CPU; and at the time of rewriting of the nonvolatile memory, a clock on the self-excited oscillator side is selected as an operation clock source for the CPU and the watchdog timer, while a clock source for peripheral devices such as a timer and a serial I/O is not switched from the clock inputted from the clock terminal. As a result, performing time measurement during rewriting not by a XIN input clock, of which frequency is different for each user, but by a clock on the self-excited oscillator side, of which frequency is always constant, enables time setting that does not depend on user's use conditions. This produces an effect of facilitating development and adjustment of the rewriting control firmware.

Moreover, because operation speed of the peripheral device is kept in a state at the time of user software execution, this produces the following effect: the operation speed can be used as it is without changing clock set values of the peripheral devices such as the timer and the serial I/O even when rewriting the nonvolatile memory.

In addition, this produces another effect of enabling us to set frequency of writing (setting) to the watchdog timer, which is periodically performed as measures against CPU's runaway, regardless of user use conditions.

According to the present invention, the self-excited oscillator for the voltage charge pump in the nonvolatile memory is also used for the built-in self-excited oscillator. As a result, as compared with a case in which a dedicated self excited oscillator is additionally provided, an effect of reducing expansion of a circuit scale and a layout area to a large extend is produced.

According to the present invention, the self-excited oscillator for the voltage charge pump in the nonvolatile memory is also used for a clock source of a timer circuit. As a result, as compared with a case in which a dedicated self-excited oscillator is additionally provided, an effect of reducing expansion of a circuit scale and a layout area to a large extend is produced.

According to the present invention, the self-excited oscillator is not operated continuously; a oscillation permission bit, which can be set by the CPU, is provided; and if this bit is in a specific state, the self-excited oscillator is operated. This produces an effect of reducing power consumption of the built-in self-excited oscillator. In addition, another effect of minimizing unnecessary radiation noise caused by the oscillation is also produced.

According to the present invention, for the switching of an operation clock source, the operation clock source is allowed to be switched to a clock generated by the self-excited oscillator if a clock generated by the self-excited oscillator is selected by the clock-source selection bit, and if operation permission of the self-excited oscillator is selected by the oscillation permission bit. As a result, in the event of runaway of the CPU, even when the clock of the self-excited oscillator is selected while the built-in self-excited oscillator is in an operation inhibited state, an effect of preventing a clock of the microcomputer from stopping so that the microcomputer does not enter a unrecoverable state, is produced.

According to the present invention, the microcomputer with built-in programmable nonvolatile memory includes a plurality of operation modes, which are determined by a voltage level applied to an operation-mode-selection input terminal, wherein at least one operation mode is configured to prohibit rewriting of a rewriting-control-firmware storing area of the nonvolatile memory. Therefore, providing only this mode, which prohibits rewriting, as a public mode open to users produces an effect of preventing important rewriting control firmware from being destroyed by accidental erasure, or writing by mistake, before it occurs.

According to the present invention, the microcomputer with built-in programmable nonvolatile memory includes a plurality of operation modes that are determined by a voltage level applied to an operation-mode-selection input terminal, wherein: a second operation mode is configured as a mode in which a reset vector address that is accessed after reset is cleared is in an external area; and in this second operation mode, at least an area for storing user software in the nonvolatile memory cannot be read from the CPU, while rewriting of the area for storing user software in the nonvolatile memory and an area for storing rewriting control firmware is permitted. As a result, by placing an external memory, to which the reset vector, the rewriting control software, and the rewriting control firmware is written, in the external area, and by starting up the microcomputer with the external memory, the following effect is produced: the rewriting control firmware can be written to the firmware area of the nonvolatile memory at the start.

In addition, connecting a tester to the external area and using control of this tester produces the following effect: the rewriting control firmware can be written to the firmware area of the nonvolatile memory at the start.

According to the present invention, in the second operation mode, the area for storing rewriting control firmware in the nonvolatile memory is read by the CPU. Therefore, the following effect is produced: after writing the rewriting control firmware to the firmware area of the nonvolatile memory at the start, content of the firmware area can be read by the CPU for checking.

Moreover, this operation mode has another effect: it is possible to start up the rewriting control firmware from an external memory, and to rewrite a user area of the nonvolatile memory.

According to the present invention, the microcomputer with built-in programmable nonvolatile memory includes a plurality of operation modes that are determined by a voltage level applied to an operation-mode-selection input terminal, wherein: a third operation mode is configured as a mode in which a reset vector address that is accessed after reset is cleared is in an external area; and in this third operation mode, the nonvolatile memory area can be read from the CPU, while rewriting of the area for storing user software in the nonvolatile memory and the area for storing rewriting control firmware is permitted. As a result, by placing an external memory, to which the reset vector, the rewriting control software, and the rewriting control firmware is written, in the external area, and by starting up the microcomputer with the external memory, the following effect is produced: the rewriting control firmware can be written to the firmware area of the nonvolatile memory at the start.

In addition, connecting a tester to the external area and using control of this tester produces the following effect: the rewriting control firmware can be written to the firmware area of the nonvolatile memory at the start.

According to the present invention, the microcomputer with built-in programmable nonvolatile memory includes a plurality of operation modes that are determined by a voltage level applied to an operation-mode-selection input terminal, wherein: a fourth operation mode is configured as a mode in which direct writing to a built-in RAM from outside during resetting is permitted, and in which a reset vector address after clearing the reset is set in the RAM; and in this fourth operation mode, the nonvolatile memory area can be read from the CPU, while rewriting of the area for storing user software in the nonvolatile memory and the area for storing rewriting control firmware is permitted. As a result, by transferring content of an external memory, to which the reset vector, the rewriting control software, and the rewriting control firmware is written, to the RAM, and by starting up the microcomputer with the RAM, the following effect is produced: the rewriting control firmware can be written to the firmware area of the nonvolatile memory at the start.

According to the present invention, a state of the operation-mode-selection input terminal can be read by the CPU. As a result, judgment whether or not the firmware area can be rewritten by the rewriting control firmware becomes possible. Therefore, increases in a circuit scale and in a layout area are smaller than those in the case in which prohibition/permission of rewriting to the firmware area are controlled by hardware. This produces an effect of facilitating measures for revision, and the like, in the event that a bug is found.

According to the present invention, the rewriting control firmware reads a state of the operation-mode-selection input terminal; and in the operation mode in which rewriting of the firmware area of the nonvolatile memory is prohibited, the rewriting-control-firmware storing area of the nonvolatile memory is not rewritten, and it is judged to be an illegal command. Therefore, increases in a circuit scale and in a layout area are smaller than those in the case in which prohibition/permission of rewriting to the firmware area are controlled by hardware. This produces an effect of facilitating measures for revision, and the like, in the event that a bug is found.

According to the present invention, the microcomputer with built-in programmable nonvolatile memory includes a rewriting command for firmware storing area which is enabled in an operation mode in which rewriting of the rewriting-control-firmware storing area of the nonvolatile memory is permitted. Therefore, treating this command as a command, which is not open to users, produces an effect of preventing important rewriting control firmware from being destroyed by accidental erasure, or writing by mistake, before it occurs.

In this connection, the following configuration is also possible: the CPU has a control-signal-output control bit that can be set via an internal data bus; and as soon as the CPU performs writing to this control-signal-output control bit, a state, which has been previously written to the control signal register, is output to the power-supply pump circuit and the memory decoder as a control signal. As a result, if a number of bits of the control signal register (a number of control signals is required) is more than a number of bits of data buses in the microcomputer, and even when it is necessary to repeat settings more than once, a control signal group, which should be output to the power-supply pump circuit and the memory decoder, are concurrently changed. Therefore, it is possible to deal with this problem by providing this control-signal-branch-output control bit.

What is claimed is:

1. A microcomputer with built-in programmable nonvolatile memory, said microcomputer comprising:
   a nonvolatile memory for storing rewriting control firmware and user software in separate unit blocks respectively;
   at least four registers, which can be written or read by a CPU of the microcomputer:
      a command register for specifying content of rewriting control;
      an address register for specifying an address to be subjected to rewriting control;
      a data register for specifying data to be written; and
      a control signal register for specifying a control signal for a power-supply pump circuit in a nonvolatile memory and a memory decoder,
   wherein the power-supply pump circuit and the memory decoder are controlled by associating given bits of the control signal register with control signals connected to the power-supply pump circuit and the memory decoder, and
   the rewriting control firmware reads a value that is set in the command register, the address register, or the data register, and rewrites a set value in the control signal register according to a sequence specified for each command corresponding to said read value, which is set in the command register, the address register, or the data register, to operate the power-supply pump circuit and the memory decoder, thereby executing rewriting processing including "erase" and "program" of the nonvolatile memory.

2. The microcomputer with built-in programmable nonvolatile memory according to claim 1, wherein a unit block for storing the rewriting control firmware and a unit block for storing the user software are configured so that addresses of both the unit blocks are not consecutive.

3. The microcomputer with built-in programmable nonvolatile memory according to claim 1, further comprising a status register that can be written or read by a CPU of the microcomputer,
wherein after completion of rewriting processing that includes "erase" and "program", the rewriting control firmware writes a result of the execution into the status register.

4. The microcomputer with built-in programmable nonvolatile memory according to claim 1, wherein the rewriting control firmware comprises a user interface control unit for decoding at least a command that is set in the command register; and a command-execution control unit for controlling the power-supply pump circuit and the memory decoder for each specified command; and
firmware of this command-execution control unit is transferred to a built-in RAM, and is executed on this RAM.

5. The microcomputer with built-in programmable nonvolatile memory according to claim 1, wherein the rewriting control firmware is configured to start up as a result of a jump from the user software to a top address of the rewriting control
firmware, and to return to a next instruction of the jump instruction in the user software after command execution is completed.

6. The microcomputer with built-in programmable nonvolatile memory according to claim 1, wherein a number of bits of a command code, which should be written to the command register, ranges from 12 to 16; and the rewriting control firmware decodes all of the bits of this command code.

7. The microcomputer with built-in programmable nonvolatile memory according to claim 1, wherein a number of bits of an address, which should be written to the address register, is taken to be more than a number of bits of an address that can specify a nonvolatile memory space; and the rewriting control firmware decodes all of the bits of this address.

8. The microcomputer with built-in programmable nonvolatile memory according to claim 1, wherein the control signal register is a register that can be set by the CPU; and a control signal, which is output from the control signal register, resets the power-supply pump circuit and the memory decoder by a watchdog-timer interrupt signal, to a state in which rewriting is prohibited.

9. The microcomputer with built-in programmable nonvolatile memory according to claim 1, wherein an accumulator in the CPU is allocated as a command register.

10. The microcomputer with built-in programmable nonvolatile memory according to claim 1, further comprising a dedicated timer circuit used when the nonvolatile memory is rewritten.

11. The microcomputer with built-in programmable nonvolatile memory according to claim 1, further comprising a clock switching circuit for switching an operation clock source for the CPU and the peripheral device to a clock input from a clock terminal or to a clock generated by a built-in self-excited oscillator,
wherein these clocks are switched according to a state of the clock-source selection bit that can be set by the CPU, and
at the time of rewriting of the nonvolatile memory, a clock on the self-excited oscillator side is selected.

12. The microcomputer with built-in programmable nonvolatile memory according to claim 1, further comprising a clock switching circuit for switching an operation clock source for the CPU to a clock input from a clock terminal or to a clock generated by a built-in self-excited oscillator,
wherein these clocks are switched according to a state of the clock-source selection bit that can be set by the CPU, and
at the time of rewriting of the nonvolatile memory, a clock on the self-excited oscillator side is selected as an operation clock source for the CPU, while a clock source for peripheral devices such as a timer and a serial I/O is not switched from the clock input from the clock terminal.

13. The microcomputer with built-in programmable nonvolatile memory according to claim 1, further comprising a clock switching circuit for switching an operation clock source for the CPU and a watchdog timer to a clock input from a clock terminal or to a clock generated by a built-in self-excited oscillator,
wherein these clocks are switched according to a state of the clock-source selection bit that can be set by the CPU, and
at the time of rewriting of the nonvolatile memory, a clock on the self-excited oscillator side is selected as an operation clock source for the CPU and the watchdog timer, while a clock source for peripheral devices such as a timer and a serial I/O is not switched from the clock input from the clock terminal.

14. The microcomputer with built-in programmable nonvolatile memory according to claim 11, wherein the self-excited oscillator for the voltage charge pump in the nonvolatile memory is also used for the built-in self-excited oscillator.

15. The microcomputer with built-in programmable nonvolatile memory according to claim 1, said microcomputer including:
a plurality of operation modes, which are determined by a voltage level applied to an operation-mode-selection input terminal,
wherein at least one operation mode is configured to prohibit rewriting of a rewriting-control-firmware storing area of the nonvolatile memory.

16. The microcomputer with built-in programmable nonvolatile memory according to claim 1, said microcomputer including:
a plurality of operation modes that are determined by a voltage level applied to an operation-mode-selection input terminal,
wherein a second operation mode is configured as a mode in which a reset vector address that is accessed after reset is cleared is in an external area, and
in this second operation mode, at least an area for storing user software in the nonvolatile memory cannot be read from the CPU, while rewriting of the area for storing user software in the nonvolatile memory and an area for storing rewriting control firmware is permitted.

17. The microcomputer with built-in programmable nonvolatile memory according to claim 16, wherein in the second operation mode, the area for storing rewriting control firmware in the nonvolatile memory can be read by the CPU.

18. The microcomputer with built-in programmable nonvolatile memory according to claim 15, wherein:
a state of the operation-mode-selection input terminal can be read by the CPU.

19. The microcomputer with built-in programmable nonvolatile memory according to claim 15, wherein:

the rewriting control firmware reads a state of the operation-mode-selection input terminal; and in the operation mode in which rewriting of the firmware area of the nonvolatile memory is prohibited, the rewriting-control-firmware storing area of the nonvolatile memory is not rewritten, and an illegal command is determined.

* * * * *